United States Patent
Ohmi et al.

[11] Patent Number: 5,945,755
[45] Date of Patent: Aug. 31, 1999

[54] STARTER WITH HOUSING FOR CANTILEVER-MOUNTING ON ENGINE

[75] Inventors: Masanori Ohmi, Anjou; Tsutomu Shiga, Nukata-gun, both of Japan

[73] Assignee: Denso Corporation, Kariya, Japan

[21] Appl. No.: 08/826,811

[22] Filed: Mar. 25, 1997

Related U.S. Application Data

[63] Continuation-in-part of application No. 08/378,383, Jan. 25, 1995, Pat. No. 5,625,242, Apr. 29, 1997.

[30] Foreign Application Priority Data

Sep. 20, 1994 [JP] Japan .................................. 6-225042
May 20, 1996 [JP] Japan .................................. 8-124168

[51] Int. Cl.$^6$ .................................................. H02K 7/10
[52] U.S. Cl. .................. 310/75 R; 310/67 R; 310/68 R; 310/75 D; 310/75 R; 290/38 R; 290/48; 290/38 C
[58] Field of Search ............................... 310/67 R, 68 R, 310/75 R, 7 D; 290/48, 38 C; 74/7 A, 7 E

[56] References Cited

U.S. PATENT DOCUMENTS

| | | | |
|---|---|---|---|
| 1,416,256 | 5/1922 | Borger | 310/179 |
| 3,209,187 | 9/1965 | Angele | 310/237 |
| 3,521,101 | 7/1970 | Arora | 310/260 |
| 3,726,003 | 4/1973 | Hellmann et al. | 29/597 |
| 3,997,806 | 12/1976 | Noto et al. | 310/268 |
| 4,547,687 | 10/1985 | Arai | 310/58 |
| 4,626,720 | 12/1986 | Fukasaku et al. | 310/62 |
| 4,707,630 | 11/1987 | Tomite et al. | 310/58 |
| 4,743,078 | 5/1988 | Dahnert | 312/201 |
| 4,748,358 | 5/1988 | Rühle et al. | 310/154 |
| 4,827,173 | 5/1989 | Corbach et al. | 310/218 |
| 4,862,027 | 8/1989 | Isozumi et al. | 310/94 |
| 4,873,461 | 10/1989 | Brennan et al. | 310/47 |
| 4,918,830 | 4/1990 | Aso | 29/596 |
| 5,014,563 | 5/1991 | Izozumi | 74/7 R |
| 5,081,874 | 1/1992 | Isozumi | 74/7 A |
| 5,105,114 | 4/1992 | Sickle et al. | 310/154 |
| 5,111,705 | 5/1992 | Isozumi | 74/6 |
| 5,130,596 | 7/1992 | Umeki | 310/234 |
| 5,208,582 | 5/1993 | Isozumi | 290/48 |
| 5,268,607 | 12/1993 | McManus | 310/89 |
| 5,323,663 | 6/1994 | Ohgi et al. | 74/7 E |
| 5,353,658 | 10/1994 | Nagashima et al. | 74/7 A |
| 5,475,276 | 12/1995 | Shiga et al. | 290/418 |
| 5,481,147 | 1/1996 | Kaplan et al. | 310/154 |
| 5,508,577 | 4/1996 | Shiga | 310/201 |
| 5,521,441 | 5/1996 | Shiga | 310/201 |
| 5,557,976 | 9/1996 | Moribayashi et al. | 74/7 E |
| 5,584,202 | 12/1996 | Kanamaru et al. | 72/105 |

FOREIGN PATENT DOCUMENTS

| | | | |
|---|---|---|---|
| 50 100505 | 8/1975 | Japan | 310/234 |
| 54-119606 | 8/1979 | Japan | 310/234 |
| 61-126759 | 8/1986 | Japan | 310/234 |
| 63-65861 | 4/1988 | Japan | 310/234 |
| 63-194541 | 8/1988 | Japan | 310/234 |
| 1-218341 | 8/1989 | Japan | 310/234 |
| 1-180157 | 12/1989 | Japan | 310/234 |
| 6-024368 | 3/1994 | Japan | 310/234 |

OTHER PUBLICATIONS

Journal of Nippondenso Technical Disclosure No. 54 068, Jul. 15, 1987.
Journal of Nippondenso Technical Disclosure No. 54 047, Jul. 15, 1987.

*Primary Examiner*—Elvin G. Enad
*Attorney, Agent, or Firm*—Pillsbury Madison & Sutro LLP

[57] ABSTRACT

A starter has a housing formed with a fitting part and a flange on the outer periphery thereof. The fitting part is in circular shape when viewed in the axial direction and is press-fitted, in the socket-and-spigot joint manner, into a fitting hole of an engine-side body with the flange being in abutment with a fitting plane of the engine-side body. The outer diameter Ho of the fitting part is set larger than the axial length of the center of gravity of an armature of a starter motor from a fitting plane of the flange.

17 Claims, 23 Drawing Sheets

FIG. II
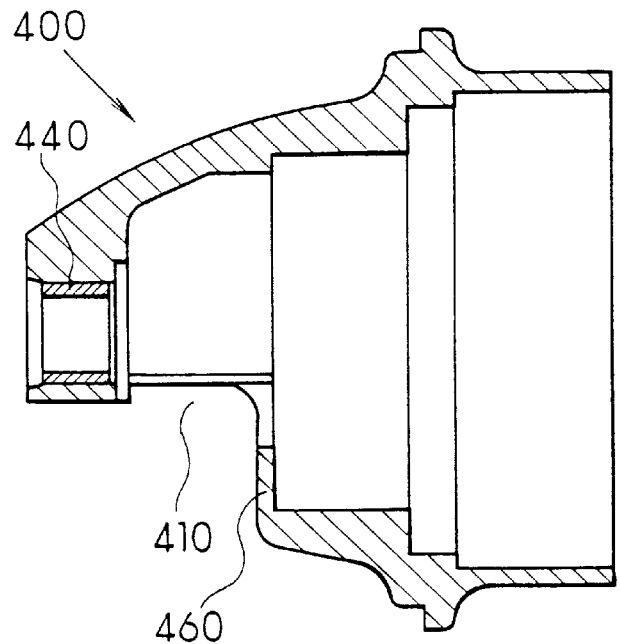
FIG. 12
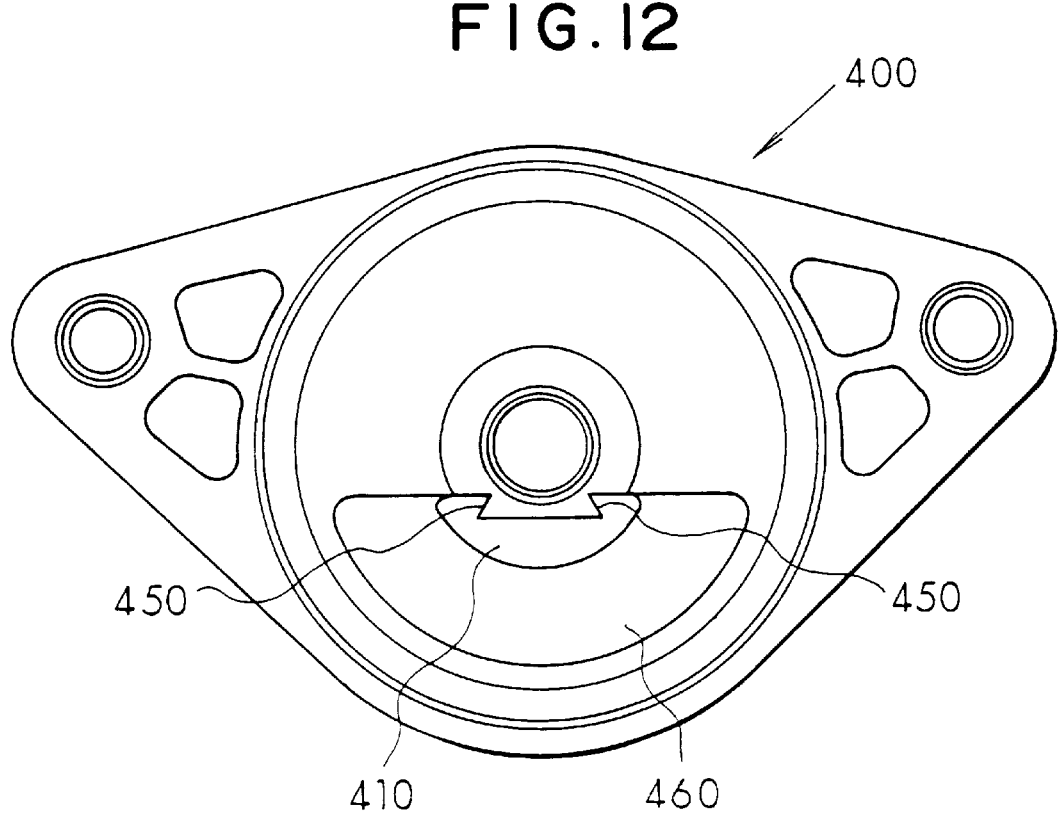

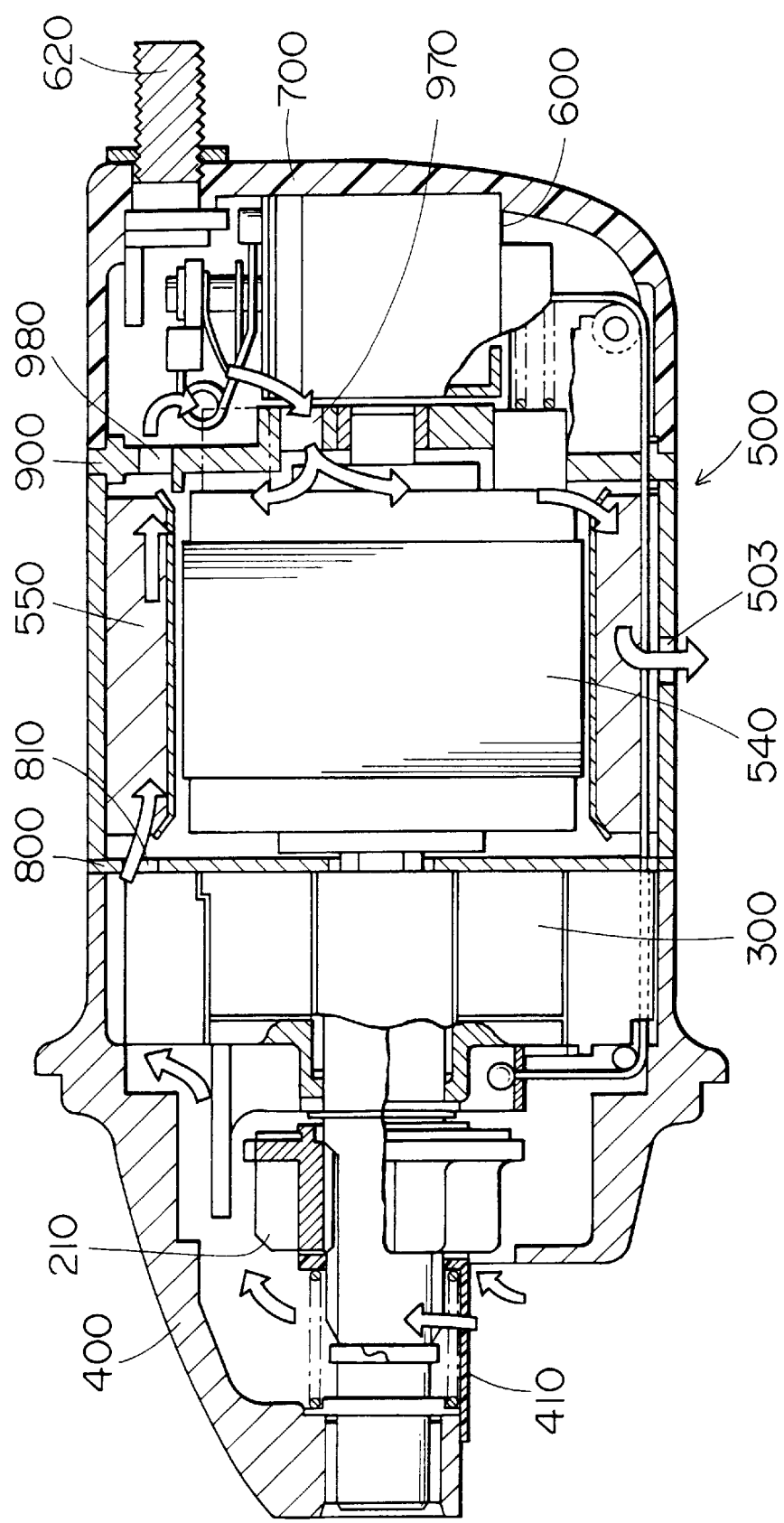

1

STARTER WITH HOUSING FOR CANTILEVER-MOUNTING ON ENGINE

CROSS REFERENCE TO RELATED APPLICATION

This is a continuation-in-part application of the patent application Ser. No. 08/378,383 filed on Jan. 25, 1995 and issued on Apr. 29, 1997 as U.S. Pat. No. 5,625,242.

BACKGROUND OF THE INVENTION

1. Field of the Invention

The present invention relates to a starter adapted for a cantilever-type mounting on an engine-side body via a fitting part of a housing.

2. Related Art

A starter for an engine is generally designed to be mounted on an engine-side body such as an engine block or an engine ring gear housing in a cantilever manner by press-fitting its housing tightly into a fitting hole formed on a fitting plane of the engine-side body and fastening its flange to the fitting plane via bolts.

As an engine in an automotive vehicle is run at higher speeds which will cause larger vibration and an increasing number of auxiliary equipment reduces space in the engine compartment recently, a starter is required to be more vibration-resistant, compact and powerful. To meet those requirements, a starter having a speed reduction mechanism is provided. In the case of using an external gear engagement type reduction mechanism, the cantilever-type mounting is not resistant enough to the vibration because the starter output shaft and the starter motor having relatively large weight are not aligned coaxially. In the case of using an epicycle reduction gear mechanism, the output shaft and the motor can be aligned coaxially. However, as the epicycle reduction gear mechanism is located between the output shaft and the motor, the motor having relatively large weight is necessarily located away from the fitting plane of the engine-side body. As a result, the vibration resistivity is not satisfactory either.

To improve the resistivity to the vibration, JP-U 63-65861 proposes to provide a stay on a rear cover of a starter and to mount the starter by fixing the rear cover to the engine-side body via the stay as well as fixing a housing of the starter. This starter, however, necessitates the stay as an additional part on the starter and a fixing part on the engine-body side for the stay. The stay further requires additional space in the engine compartment degrading mountability of the engine to the engine-side body.

SUMMARY OF THE INVENTION

It is therefore an object of the present invention to provide a starter which is vibration-resistant and can be mounted on an engine-side body without difficulty.

According to the present invention, a housing of a starter is provided with a fitting part which is to be press-fitted into a fitting hole formed in a fitting plane of an engine-side body in a cantilever manner. The outer diameter of the fitting part of the housing is set larger than the distance between the fitting part and the weight center of an armature of a starter motor so that the stress which will exert on the fitting plane of the engine-side body can be reduced. Thus, even in the case that the starter is mounted on the engine-side body in the cantilever manner, the starter can be maintained vibration-resistant against increasing vibration caused by increasing rotation speed of the engine.

Preferably, the outer diameter of the fitting part of the housing is set larger than the distance between the fitting part of the housing and the armature core axial side end which is located oppositely to or farther away from the fitting plane of the engine-side body.

More preferably, a magnet switch of the starter is located axially adjacently to the starter motor at the position opposite to the fitting plane of the engine-side body. In comparison with a starter having a magnet switch located radially outside the starter motor, the mountability of the starter on the engine-side body can be improved because the radial size of the starter can be maintained small. Further, as the center of gravity of the magnet switch can be positioned closer to an armature rotation shaft, the influence of the vibration on the magnet switch can be reduced as well.

BRIEF DESCRIPTION OF THE DRAWINGS

These and other objects, features and advantages of the present invention will become more apparent from the following detailed description, the appended claims and drawings, in which:

FIG. 11 is a cross-sectional view illustrating the side of a housing;

FIG. 12 is a front view of the housing;

FIG. 39 is a cross-sectional view illustrating cooling air passages in the first embodiment;

DETAILED DESCRIPTION OF PRESENTLY PREFERRED EMBODIMENTS

Figure 1:
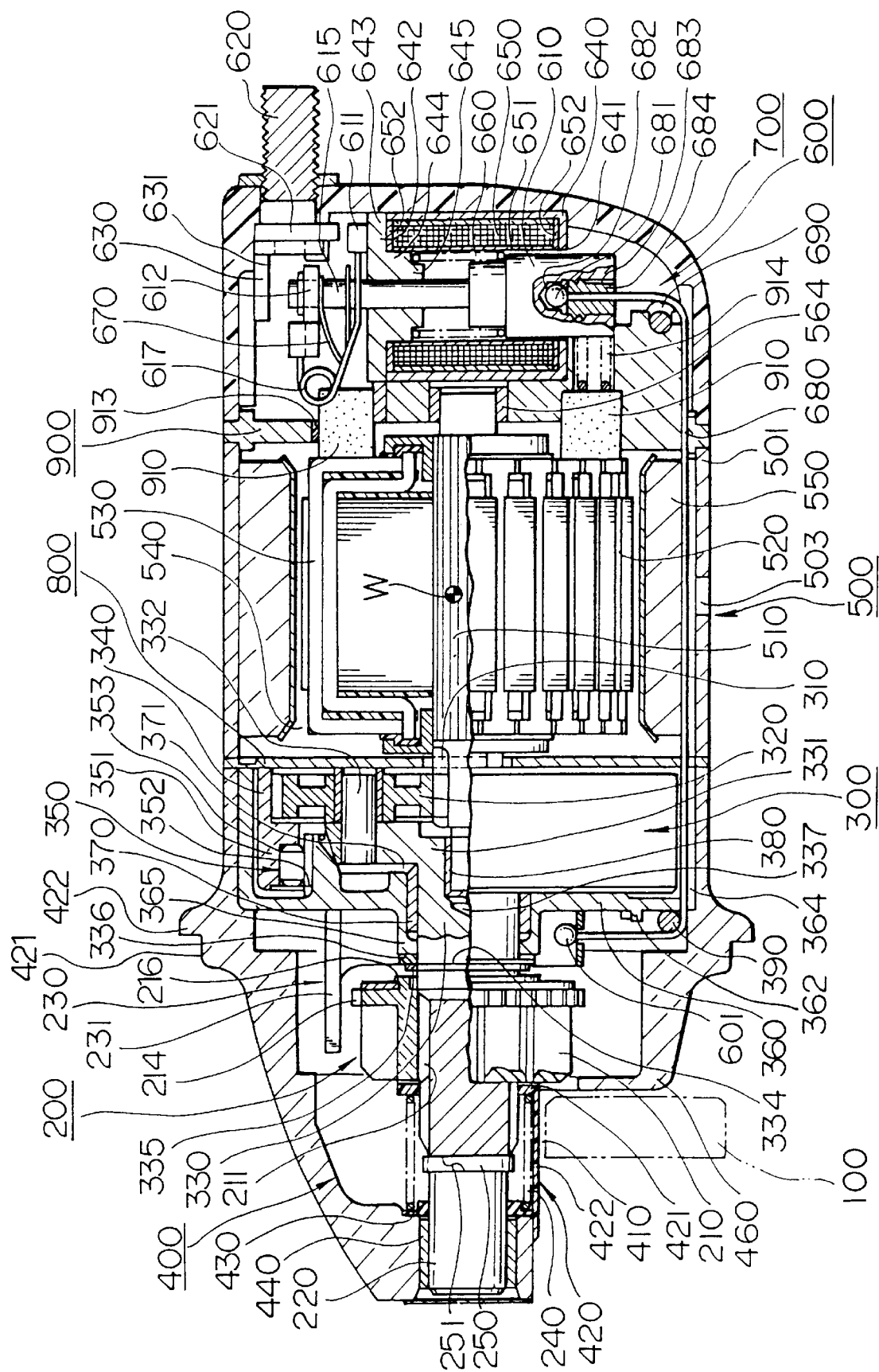
FIG. 1 is a cross-sectional view illustrating a starter according to the first embodiment of the present invention.

The present invention will be described in more detail with reference to various embodiments shown in the accompanying drawings in which the same or similar component parts are denoted by the same or similar reference numerals throughout the embodiments.

FIRST EMBODIMENT

The starter according to the first embodiment is largely comprised of, as shown in FIG. 1, pinion 200 that engages with ring gear 100 laid on an engine (not shown), housing 400 that covers the pinion 200 and epicycle gear reduction mechanism 300, starter motor 500, magnet switch 600 and end frame 700 that covers magnet switch 600. Inside the starter having the reduction mechanism, housing 400 and starter motor 500 are separated by motor wall 800. Starter motor 500 and end frame 700 are separated by brush holding member 900.

Housing 400 is formed fitting part 421 and flange 422 on its outer circumference, and the radial outer diameter of fitting part 421 is set larger than the axial distance between fitting part 421 (or flange 422) and the center of gravity W of motor 500 (more particularly, of armature 540 of motor 500).

Through bolts (not illustrated) pass through the multiple (four in present embodiment) bolt through holes (not illustrated in FIGS. 1 or 39) formed on the periphery of end frame 700, multiple bolt through holes 990 (FIG. 35) formed on the periphery of brush holding member 900, the outer side of multiple concave grooves 502 (FIG. 29) formed to indent inward on the periphery of starter motor 500, and the multiple bolt through holes (not illustrated) formed on the periphery of motor wall 800. The through bolts are fastened to the screw holes (not illustrated) formed on the end of housing 400, to fix housing 400, yoke 501 of starter motor 400, and end frame 700 via motor wall 800 and brush holding member 900.

Figure 3A:
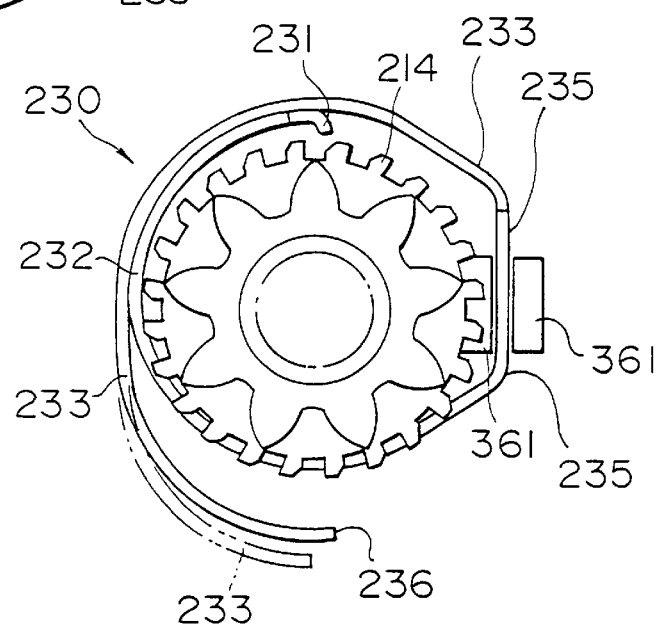
FIGS. 3A and 3B are a front view and partial cross-sectional view, respectively, illustrating the state when the pinion rotation restriction member is assembled onto a pinion portion.
Figure 3B:
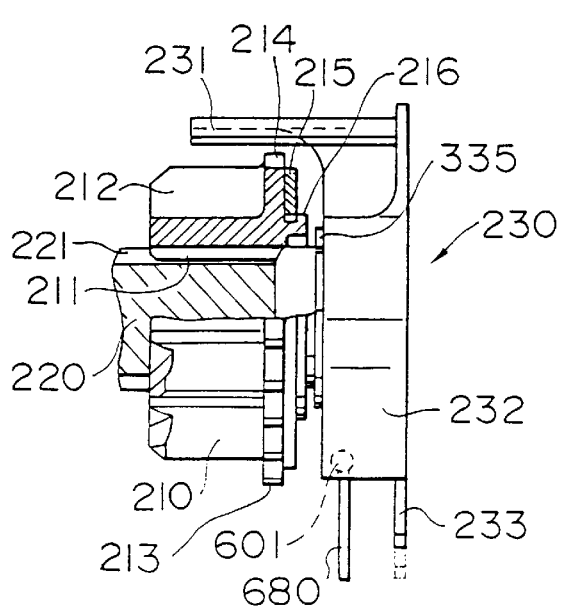

As shown in FIG. 1 or FIGS. 3A and 3B, pinion gear 210 that engages with engine ring gears 100 are formed on pinion 200. Pinion helical spline 211 that fits with helical spline 221 formed on output shaft 210 is formed on the inner circumference of pinion gear 210.

A flange 213 having an outer diameter dimension that is larger than pinion gear 210 is formed in a ring-shape on the ring gear side opposite of pinion gear 210. Notches 214, which are formed in a greater number than the outer teeth of pinion gear 210, are formed on the outer circumference of flange 213. Notches 214 fit with restriction claw 231 on the later-described pinion rotation restriction member 230. Washer 215 can freely rotate and does not fall out in the axial direction at the rear of flange 213 as round ring portion 216 formed on the rear end of pinion gear 210 is bent toward the outer circumference.

By setting washer 216 that can freely rotate on the rear side of flange 213 of pinion gear 210, if pinion rotation restriction member 230, described later, falls behind pinion gear 210, the front end of restriction claw 231 of pinion rotation restriction member 230 will contact washer 215. Therefore, the rotation of pinion gear 210 does not directly contact restriction claw 231 of pinion rotation restriction member 230, and washer 215 rotates to prevent pinion gear 210 from being worn by restriction claw 231 of pinion rotation restriction member 230.

Pinion gear 210 is constantly energized toward the rear of output shaft 220 by return spring 240 made from compressed coil spring. Return spring 240 does not directly bias pinion gear 210, but in this embodiment biases pinion gear 210 via ring body 421 on shutter 420, described later, that opens and closes opening portion 410 of housing 400.

Figure 2:
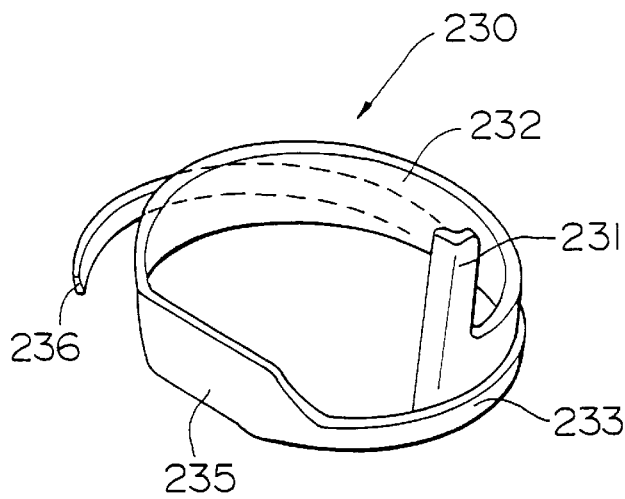
FIG. 2 is a perspective view of a pinion rotation restriction member.

Pinion rotation restriction member 230 is a plate spring member that is wound approximately one and a half times as shown in FIG. 2, FIGS. 3A and 3B. Approximately half of the windings are rotation restriction portion 232 having a high spring constant with a long axial plate length, and the remaining approximately half of the windings is return spring portion 233 that acts as the low spring constant energizing means with the short axial plate length.

Restriction claw 231 that forms the restriction portion extends in the axial direction to fit with multiple notches 214 formed on flange 213 of pinion gear 210 and is formed on one end of rotation restriction portion 232. Restriction claw 231 fits with notches 214 on pinion gear 210. Furthermore, to improve the rigidity of restriction claw 231, restriction claw 231 is formed to extend in the axial direction, and has a cross-sectional L-shape that is bent toward the inner radial direction. The claw is bar-shaped.

Rotation restriction portion 232 has linear portion 235 that extends vertically. Linear portion 235 is supported to freely slide vertically between the two support arms 361 that are set to project on the front side of the center bracket. In other words, as linear portion 235 moves vertically, rotation restriction portion 232 also moves vertically.

Furthermore, at a position 180° opposite from restriction claw 231 of rotation restriction portion 232, front end sphere 601 of string-shaped member 680 (for example, a wire) that conveys the movement of magnet switch 600, explained later, is fit. The curvature of the winding is large on an end portion side of return spring 233, and one end 236 of return spring portion 233 contacts the upper surface of restriction shelf 362 set to project to the lower front of center bracket 360.

The operation of pinion rotation restriction member 230 is explained in this section. String-shaped member 680 is a conveyance means to convey magnet switch 600 operation to restriction claw 231. Rotation restriction portion 232 is pulled downward according to magnet switch 600 operation so that restriction claw 231 fits with one of notches 214 on flange 213 of pinion gear 210. At that time, one end 236 of return spring portion 233 contacts restriction shelf 362 to restrict the position, and return spring portion 233 slacks, i.e. loses some of its tension. Restriction claw 231 is fit with notch 214 of pinion gear 210, so that when rotation of pinion gear 210 is attempted with armature shaft 510 of the motor and epicycle speed reduction mechanism 300, pinion gear 310 advances along helical spline 221 of output shaft 220. When pinion gear 210 contacts ring gear 100, and the advance of pinion gear 210 is thus prevented, pinion rotation restriction member 230 loses tension due to the further rotational force of output shaft 220. Pinion gear 210 will rotate slightly and engage with ring gear 100. When pinion gear 210 advances, restriction claw 231 is disengaged from notch 214, and restriction claw 231 drops behind the rear of flange 213 of pinion gear 210. The front end of restriction claw 231 contacts the rear surface of washer 215 and retraction of pinion gear 210 is prevented by rotation of engine ring gear 100.

When operation of magnet switch 600 stops and string-shaped portion 680 stops pulling rotation restriction member 230 downward, rotation restriction member 230 returns to its original position by function of return spring portion 233.

Figure 4:
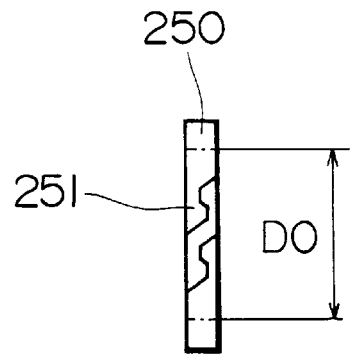
FIG. 4 is a side view of a pinion fitting ring.
Figure 6:
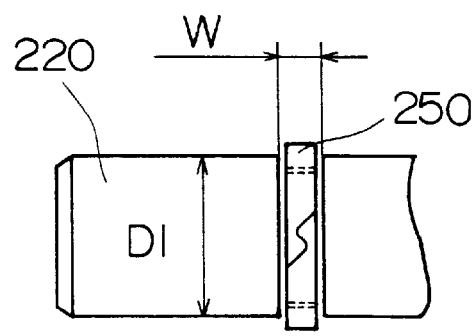
FIG. 6 is a side view illustrating the state when the pinion fitting ring is assembled onto a shaft.

Pinion fitting ring 250 is fixed on the cross-sectional rectangular ring groove formed on the periphery of output shaft 220. Pinion fitting ring 250 is formed by round-machining cross-sectional rectangular steel material. Approximate S-shaped notches 251 (example of a fitting means) are formed on both ends of pinion fitting ring 250 as shown in FIGS. 4 and 6. One convex notch fits with the other concave notch, and one convex notch fits with the other concave notch.

To assemble pinion fitting ring 250, pinion fitting ring 250 is mounted from the front end of output shaft 220 and pinion fitting ring 250 is fit within the ring-shaped groove. Pinion fitting ring 250 is pressed and tightened toward the inner diameter side, and concave notches 251 on both ends thereof are mutually fit. This completes the assembly.

Figure 5:
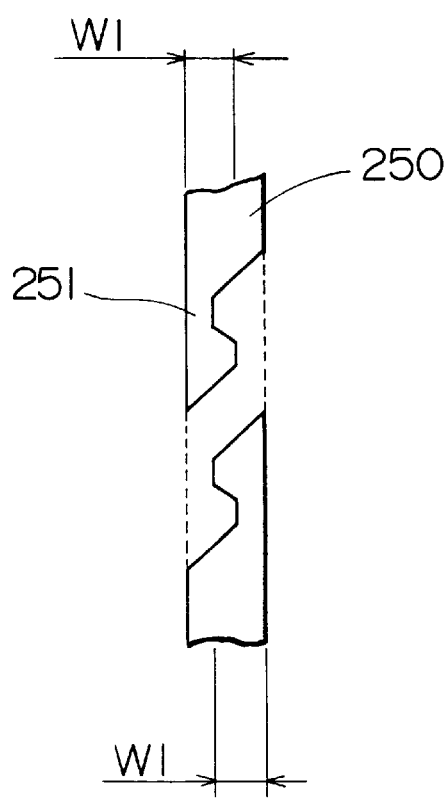
FIG. 5 is a partially enlarged side view of the pinion fitting ring.

Inner diameter Do of pinion fitting ring 250 as shown in FIG. 4 is set to be larger than outer diameter D1 (FIG. 6) of output shaft 220, and width W of the ring-shaped groove on output shaft 220 is set larger than the width of convex portion width W1 (FIG. 5) added to facing convex portion width W1 of concave notches 251.

Epicycle gear reduction mechanism 300 shown in FIG. 1 is a deceleration means that decelerates rotation of motor 500, explained later, and increases the output torque of motor 500. Epicycle gear reduction mechanism 300 is composed of sun gear 310 formed on the front outer circumference of motor 500 armature shaft 510 (explained later), multiple planetary gears 320 engaged with sun gear 310 and that rotate around sun gear 310, planet carrier 330 that rotatably supports planetary gears 320 around sun gear 310 and that is integral with output shaft 220, and tubular resin internal gear 340 engaged with planetary gears 320 on the inner circumference thereof.

Figure 7:
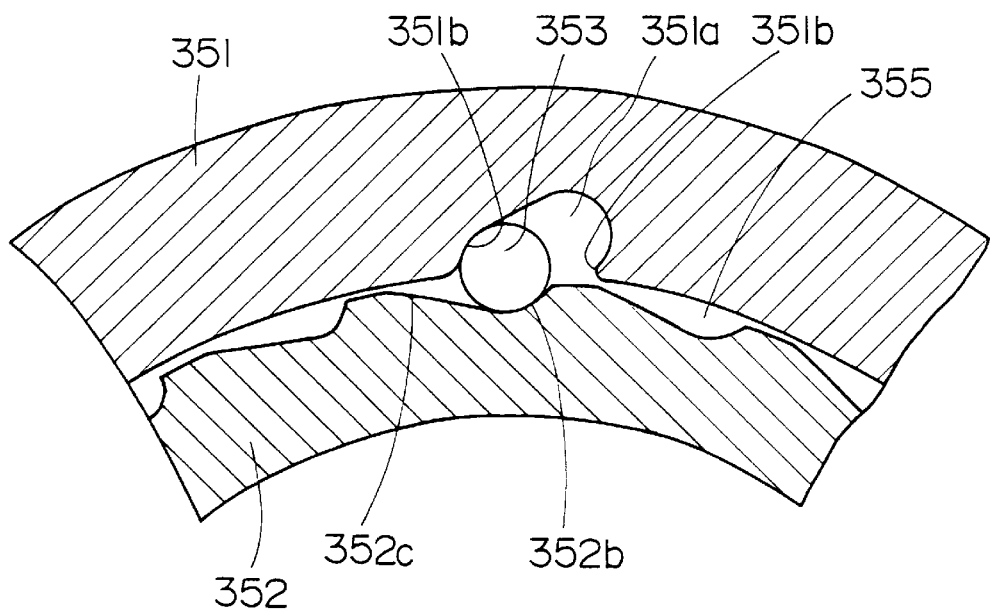
FIG. 7 is a cross-sectional view illustrating components of an overrunning clutch.

Overrunning clutch 350 rotatably supports internal gear 340 in one direction (only in the direction rotatable with engine rotation). FIG. 7 is a partial enlarged illustration of the overrunning clutch 350. Overrunning clutch 350 is made of clutch outer member 351 acting as the first cylindrical portion integrated with the front side of internal gear 340, ring-shaped clutch inner member 352 acting as the second cylindrical portion arranged to oppose the inner circumference of clutch outer member 351 and which is formed on the rear surface of center bracket 360 that acts as the fixing side that covers the front side of the epicycle gear mechanism 300, and roller 353 stored in roller storage portion 351a formed at an inclination to the inner circumference surface of clutch outer member 351. Roller storage portion 351a is inclined circumferentially, and has roller fitting surface 351b that fits with roller 353 during drawing of the starter having the reduction mechanism.

Multiple roller groove portions 355 are formed circumferentially on outer circumference of clutch inner member 352. Roller groove portions 355 comprise roller fitting surface 352b that fits with roller 353 when the starter having a reduction mechanism starts, and roller guide surface 352c that leads to roller storage portion 352b. On the opposite surface of roller fitting surface 351b of roller storage portion 351a, is roller storage guide portion 351d that functions to lift roller 353 up to roller storage portion 351a when the starter with the reduction mechanism overruns. The above structure is provided circumferentially at a plurality of locations.

The positional relation of clutch outer member 351, roller fitting surface 351b, and clutch inner member 352 is such that roller fitting surface 352b is configured so that roller 353 is sandwiched from before and after the torque conveyance direction by each surface when the starter having the reduction mechanism is driven.

Roller storage portion 351a of clutch outer member 351 is set so that the maximum inner diameter of roller 353 is slightly larger than the maximum outer diameter of clutch inner member 352 when the rollers are stored during overrunning of the starter having the reduction mechanism.

Figure 8:
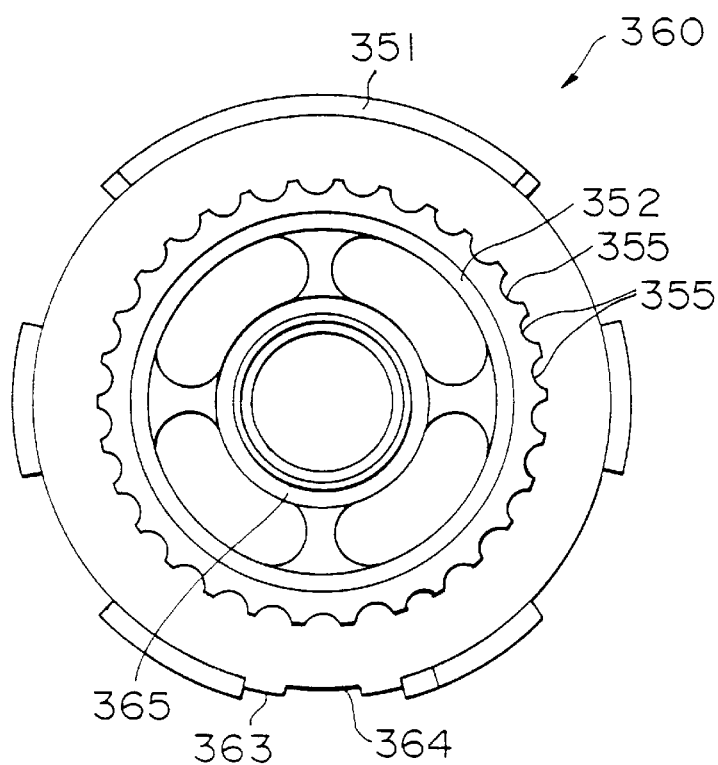
FIG. 8 is a rear view showing a center bracket.
Figure 9:
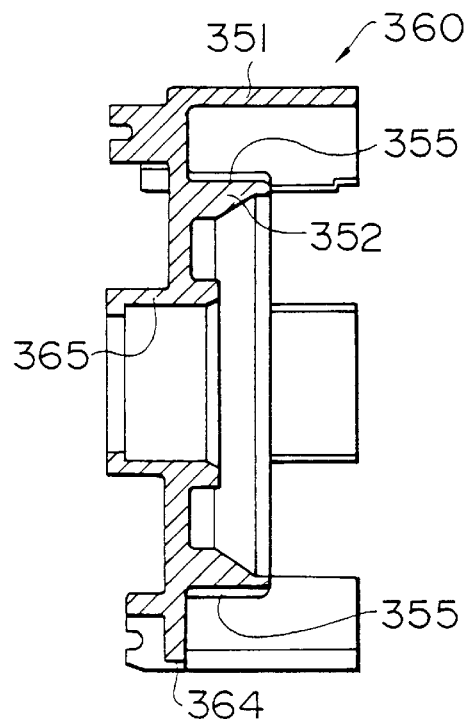
FIG. 9 is a cross-sectional view depicting the side of the center bracket.
Figure 10:
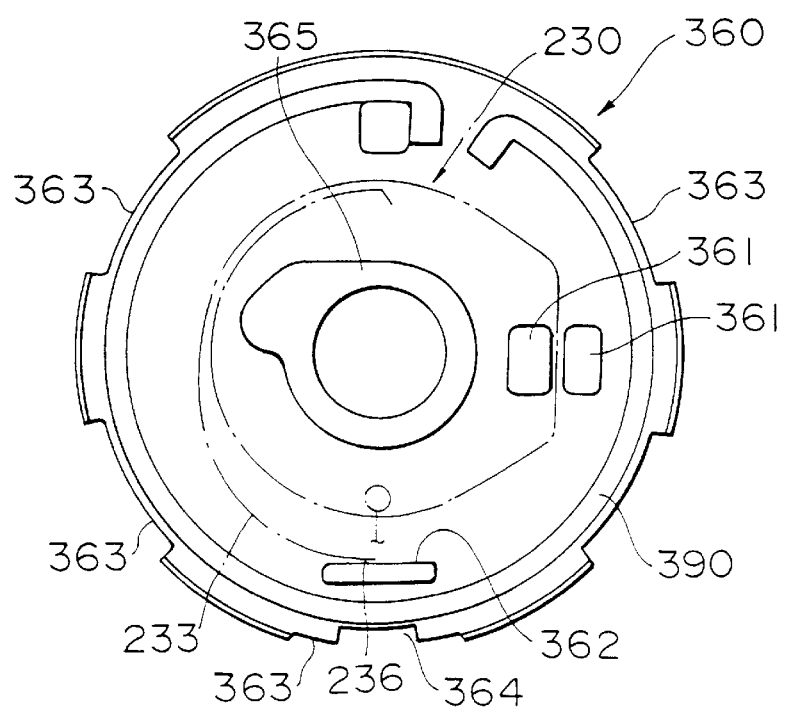
FIG. 10 is a front view showing the center bracket.
Figure 13:
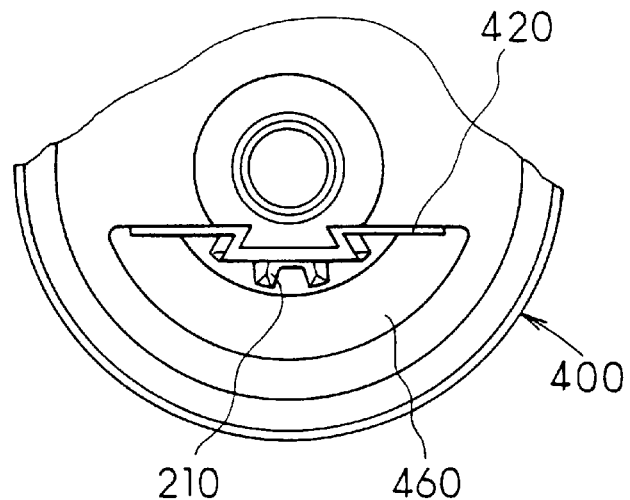
FIG. 13 is a front view illustrating the state with a shutter mounted on the housing.
Figure 14:
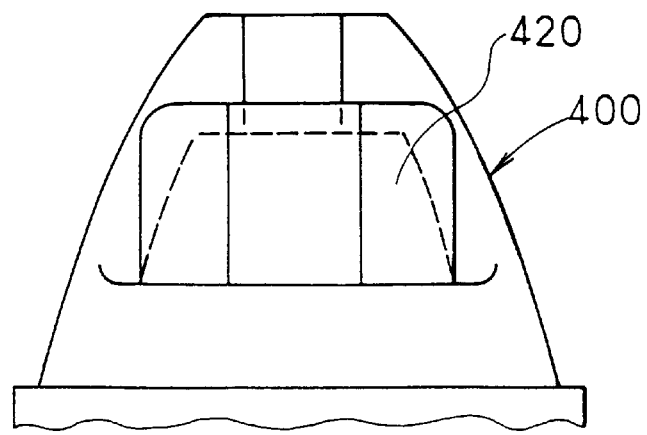
FIG. 14 is a bottom view illustrating the state where the shutter is mounted on the housing.
Figure 15:
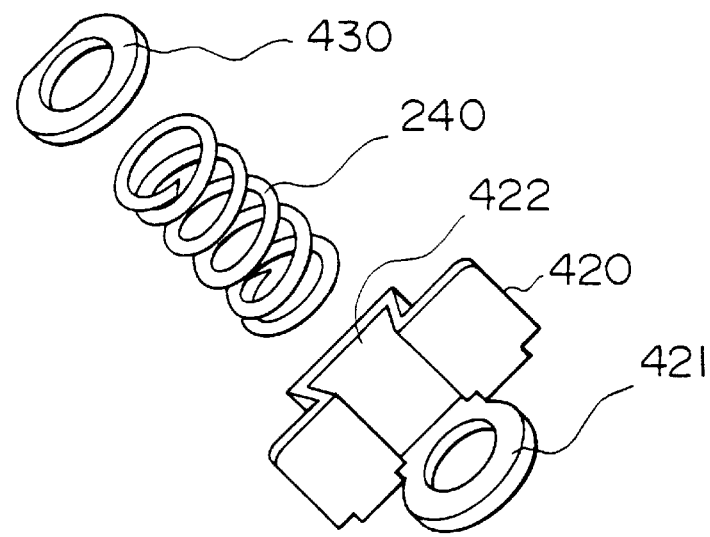
FIG. 15 is an exploded view of the shutter.

Center bracket 360 shown in FIGS. 8 through 10 is arranged inside the rear side of housing 400. Housing 400 and center bracket 360 are coupled with ring spring 390 having one end fit to housing 400 and the other end fit to center bracket 360. The rotational reaction received by clutch inner member 352 that configures overrunning clutch 350 is absorbed by ring spring 390 so that the reaction is not directly conveyed to housing 400.

Two support arms 361 that hold pinion rotation restriction member 230 and restriction shelf 362 mounted on the lower end of pinion rotation restriction member 230 are set on the front of center bracket 360. Furthermore, multiple notched portions 363 that engage with the convex notched portions (not illustrated) on the inner side of housing 400 are formed on center bracket 360. Upper notched portions 353 are also used as air passages to lead air in housing 400 into yoke 501.

This air flow operation is explained in detail in the cooling air section. Concave portions 364 are formed on the lower end of center bracket 360 to pass string-shaped members 680 (explained later) in the axial direction.

Planet carrier 330 includes flange-shaped projection portion 331 that extends in the radial direction to support planetary gear 320. Pins 332 that extend toward the rear are fixed onto flange-shaped projection portion 331, and pins 332 rotatably support planetary gear 320 via metal bearing.

Planet carrier 330 is rotatably supported by housing bearing 440 of which the front end is fixed on the inner front of housing 400 and center bracket bearing 380 fixed inside tubular portion 365 on the inner circumference of center bracket 360.

Planet carrier 330 includes ring groove 334 on the front end position of inner tubular portion 365, and snap ring 335 is fit into ring groove 334. Rotatable washer 335 mounted to planet carrier 300 is inserted between snap ring 335 and front end of inner tubular portion 365. The backward movement of planet carrier 330 is restricted by the direct contact of snap ring 335 to the forward end of inner tubular portion 365 via washer 336.

The rear end of center bracket bearing 370 that supports the rear side of planet carrier 330 has flange portion 371 sandwiched between the rear end of inner tubular portion 365 and flange-shaped projection portion 331. The forward movement of planet carrier 330 is restricted by the direct contact of flange-shaped projection portion 331 to the rear end of inner tubular portion 365 via flange portion 371.

Concave notch 337 that extends radially is created on the rear side of planet carrier 330. The forward end of the rotatable armature shaft 510 is supported via planet carrier bearing 380 arranged in concave notch 337.

As shown in FIGS. 11 and 12, housing 400 supports output shaft 220 with housing bearing 440 fixed on the inner front end of housing 400. Further, housing 400 has water barrier wall 460 that acts as a projection portion to keep the clearance between housing 400 and the outer diameter of pinion gear 210 at the lower portion of opening 410 at a minimum to reduce the amount of rain water, etc., that enters through opening 410 (FIGS. 1 or 11). On the lower front end of housing 400, two sliding grooves 450 that extend axially are created, and shutter 420, explained later, is set in slide grooves 450.

Shutter 420 is made of a resin material such as nylon, and is mounted on the periphery of output shaft 220 as shown in FIGS. 13 through 16. Shutter 420 is formed of ring body 421 sandwiched between return spring 240 and pinion gear 210, and water barrier portion 422 that opens and closes opening portion 410 of housing 400. Water barrier portion 422 is bent so that it fits slide grooves 450 formed on the lower front end of housing 400 and that extend axially from both sides. This configuration makes movement of water barrier portion 422 possible only in the axial direction of housing 400 together with ring body 421. A washer, not illustrated, is installed between shutter 420 and pinion gear 210.

Figure 16:
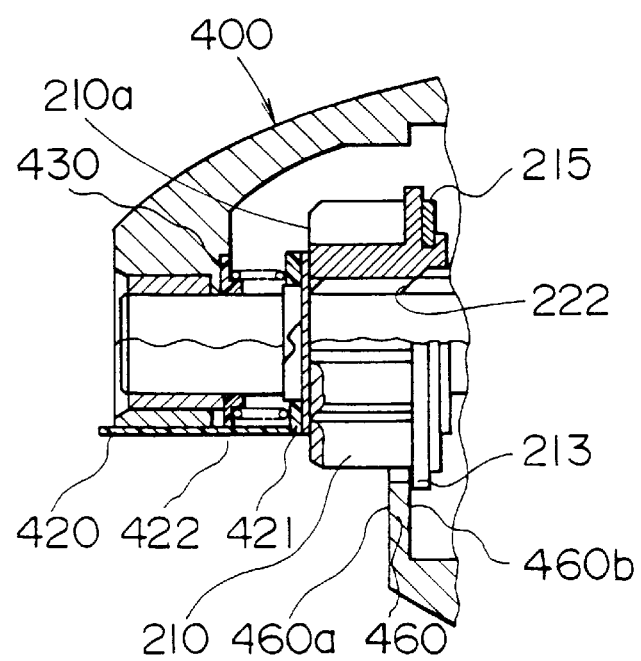
FIG. 16 is a cross-sectional view illustrating the main part of the pinion.

When the starter starts and pinion gear 210 starts advancing along output shaft 220, ring body 421 starts advancing with pinion gear 210. Water barrier portion 422 integral with ring 421 advances, thereby opening portion 410 of housing 400 (FIG. 16). When the starter stops and pinion gear 320 start retracting along output shaft 220, ring body 421 retracts with pinion gear 210. Water barrier portion 422 integral with ring 421 retracts, thereby closing opening portion 410 of housing 400. As a result, shutter 420 that acts as the opening/closing means prevents rain water that scatters as a result of the centrifugal force of ring gear 100 from entering housing 400 with water barrier portion 422 when the starter is not operating.

Tapered portion 222 is formed on the rear side of output shaft 220, and by contacting pinion helical spline 211 against tapered portion 222, backward movement of pinion gear 210 is prevented with tapered portion 222. Pinion fitting ring 250 is mounted on the front side of output shaft 220, and forward movement of pinion gear 210 is prevented by pinion fitting ring 250.

As shown in FIG. 1, when the starter having the reduction mechanism is not operating, front end 210a (FIG. 16) of pinion gear 210 does not protrude to ring gear 100 due to front end 460a (FIG. 16) of water barrier wall 460. When the starter having the reduction mechanism operates as shown in FIG. 16, flange 213 of pinion gear 210 does not contact with rear end 460b of water barrier wall 460, and thus, pinion gear 210 engages with ring gear 100.

Figure 17:
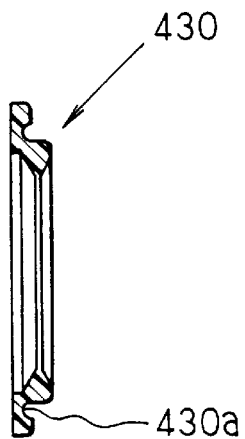
FIG. 17 is a cross-sectional view of a seal member.
Figure 18:
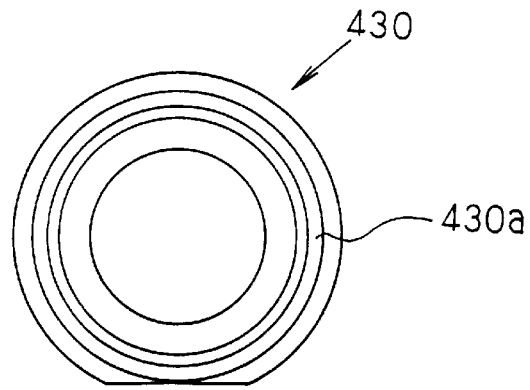
FIG. 18 is a front view of the seal member.

As shown in FIGS. 17 and 18, seal member 430 has ring groove 430a on the side thereof, and one end of return spring 240 is disposed in ring groove 430a. Seal member 430 seals the periphery of output shaft 220, and prevents rain water and dust that have entered through opening portion 410 of housing 400 from entering housing bearing 440 on the front end of housing 400.

As shown in FIG. 1, housing end seal member (for example, paper with adhesive on one end) is adhered to the end portion opening side (left-most side) of housing 400 to plug the opening surface. Metal foil or resin sheets may be used for housing end seal member 470.

Starter motor 500 is enclosed by yoke 501, motor wall 800 and brush holding member 900, explained later. Motor wall 800 sandwiches epicycle gear mechanism 300 between center bracket 360, and prevents lubrication oil in the epicycle gear mechanism from entering starter motor 500.

As shown in FIG. 1, starter motor 500 is composed of armature shaft 510, armature 540 fixed to armature shaft 510 and composed of armature core 520 and armature coil 530 that integrally rotate, and field magnetic pole 550 that rotates armature 540. Field magnetic pole 550 is fixed to the inner circumference of yoke 501.

Armature shaft 510 is rotatably supported by planet carrier bearing 380 on the inner rear of planet carrier 330 and brush holding member bearing 564 fixed on the inner circumference of brush holding member 900. The front end of armature shaft 510 is inserted through the inner side of epicycle gear reduction mechanism 300, and as mentioned above, sun gear 310 of epicycle gear reduction mechanism 300 is formed on the outer circumference of the forward end of armature shaft 510.

Figure 20:
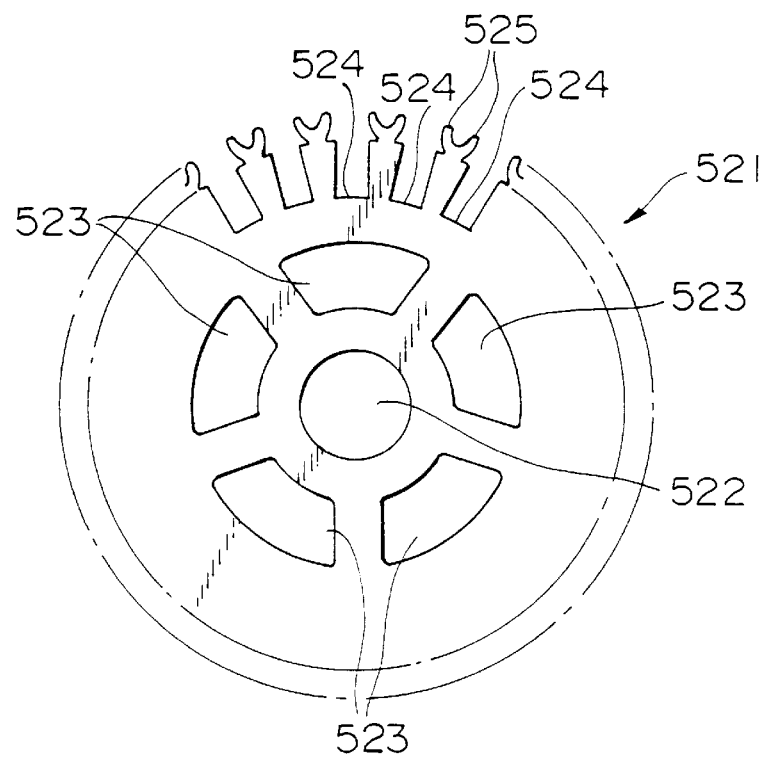
FIG. 20 is a plan view of a core plate.

Armature core 520 is formed by stacking multiple core plates as shown in FIG. 20, and force fitting the armature shaft 510 in hole 522 formed in the center. Core plate 521 is punched out of thin sheet plate on a press, and treated with surface insulation. On the inner diameter side of core plate 521 (i.e. towards hole 522), multiple holes 523 are punched to lighten the weight of core plate 521. Multiple (for example twenty-five) slots are formed on the outer circumference of core plate 521 to store armature coil 530. Fixing claws 525 are formed between each slot 524 on the outer circumference end portion of core plate 521 to fix the armature coil stored in slots 524. Fixing claws 525 will be described in the fixing procedure of armature coil 530.

Figure 19:
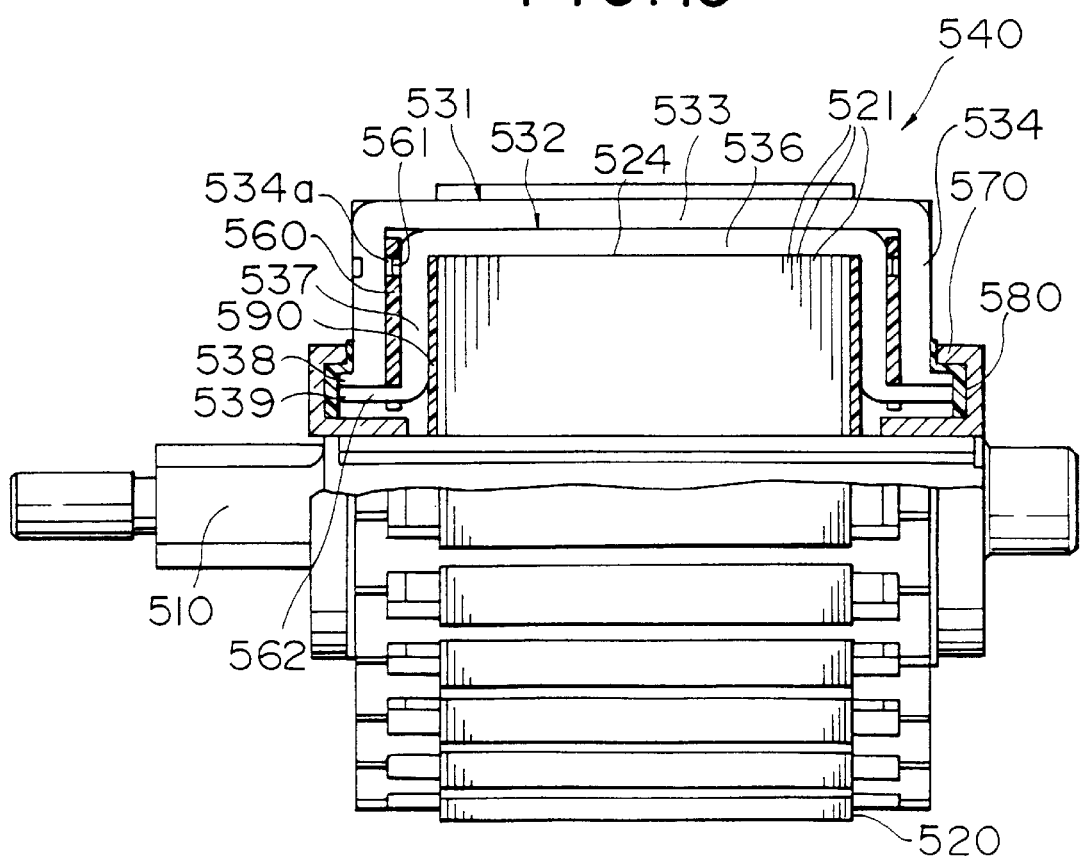
FIG. 19 is a side cross-sectional view showing an armature.

In this embodiment as shown in FIG. 19, multiple (for example twenty-five) upper armature coils 531 and the same number of lower armature coils 532 are used for armature coil 530. Each of upper armature coils 531 and lower armature coils 532 are radially piled to form two layer winding coils. Each upper armature coils 531 and each lower armature coils 532 is combined, and the ends of each upper armature coils 531 and each lower armature coils 532 are operatively and electrically connected to form a ring-shaped coil.

Upper armature coil 531 composed of a material such as copper, which has an outstanding conductivity, has upper coil piece 533 that is held in the outer circumference of slot 524, and that extends parallel to field magnetic pole 550, and has two upper coil ends 534 that are bent inward from both ends of upper coil piece 533 and that extend perpendicular in the axial direction of armature shaft 510. Upper coil piece 533 and upper coil ends 534 can be integrally shaped using cold forging, bent and formed in a U-shape with a press. Alternatively, upper coil piece 533 and upper coil ends 534 can be separately formed and then connected via welding.

Figure 23:
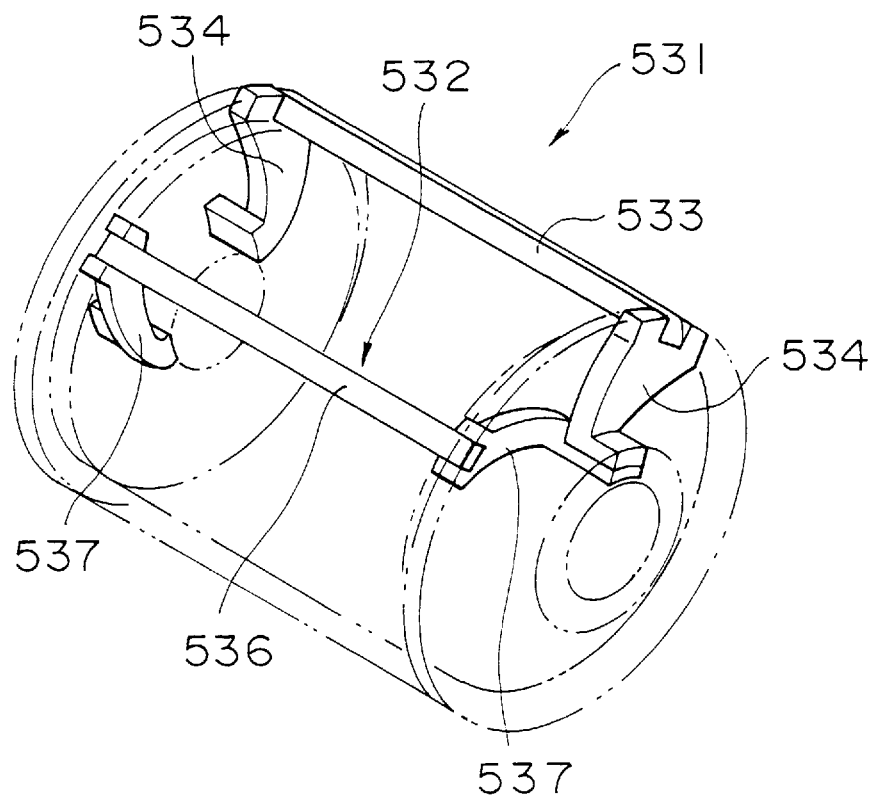
FIG. 23 is a perspective view of the disposition of the upper and lower armature coils.
Figure 24:
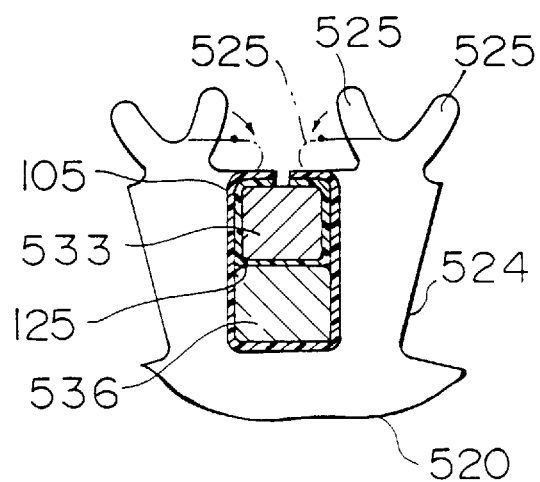
FIG. 24 is a cross-sectional view illustrating the upper coil piece and lower coil piece stored in a slot.

Upper coil piece 533 is a linear bar with a rectangular cross-section as shown in FIGS. 21 through 24. The periphery of upper coil piece 533 is covered with an upper insulating film 125 (e.g., thin resin nylon film or paper). Upper coil piece 533 is firmly stored in slot 524 with lower coil piece 536, explained later, as shown in FIG. 24.

As shown in FIG. 23, one of upper coil ends 534 is inclined to the forward side in the rotating direction, and the other upper coil end 534 is inclined to the backward side in the rotating direction. The pair of upper coil ends 534 are inclined to the radial direction at the same angle to upper coil piece 533 and formed in the same shape. Therefore, even if upper coil ends 534 are horizontally turned 180° around the center of upper armature coil 531, upper armature coil 531 retains the same shape as before reversal. In other words, as there is no difference between upper coil ends 534, the assembly of upper armature coil 531 onto armature core 520 becomes easier.

Of the pair of upper coil ends 534, upper coil end 534 positioned at the side of magnet switch 600 directly contacts brush 910, explained later, and electrically energizes armature coil 530. Because of this, at least the surfaces of upper coil ends 534 that contact brush 910 are smooth. The starter having a reduction mechanism does not require a separate commutator for electrically energizing armature coil 530. In other words, as a separate commutator is not required, the number of parts required can be reduced.

Furthermore, as the number of steps in the manufacturing process for the starter having the reduction mechanism is reduced, the manufacturing costs can be suppressed. As a separate commutator does not need to be arranged in the starter having the reduction mechanism so the structure of the starter with reduction mechanism can be reduced in size in the axial direction.

As upper coil end 534 directly contacts brush 910, the heat generated by the sliding of upper coil end 534 and brush 910 is conveyed from upper coil end 534 to upper coil piece 533, armature core 520, or armature shaft 510. The heat capacity of armature coil 530, armature core 520, and armature shaft 510 is much larger compared to the conventional separate commutator, the temperature of the sliding portion between upper coil end 534 and brush 910 can be maintained at a low level.

Figure 25:
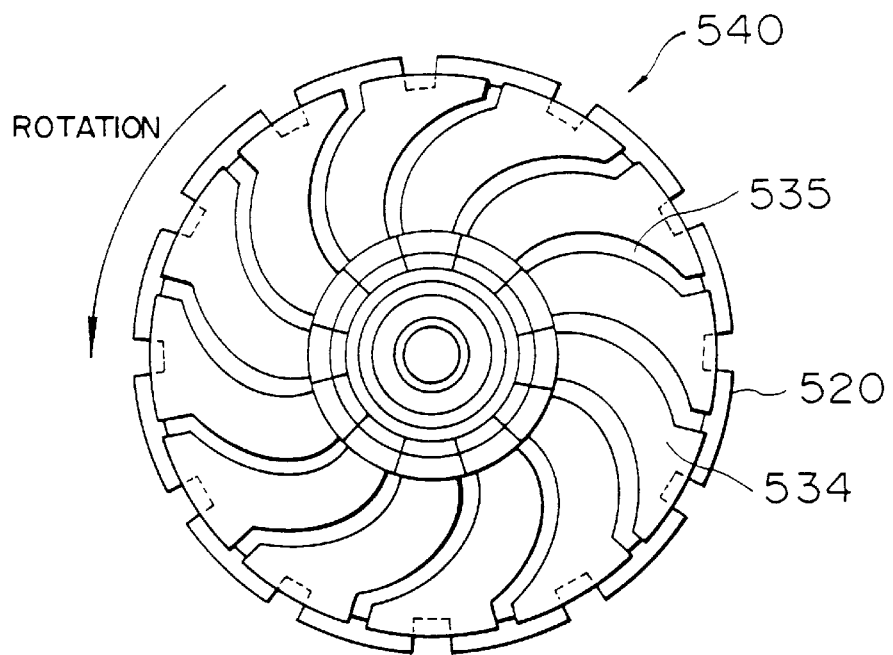
FIG. 25 is a front view of an upper coil end assembled into the armature core.

As shown in FIG. 25, the shape of upper coil end 534 gradually expands in the radial direction, and the circumferential clearance 535 of each upper coil end 534 is maintained to be almost uniform from the inner circumference to the outer circumference. This enlarges the contact area between upper coil end 534 and brush 910, which in turn allows the heat from brush 910 to be easily transmitted to the armature coil, and the temperature of brush 910 to be drastically suppressed. FIG. 25 is provided only to explain the shape of upper coil end 534 clearly, and the number of upper coil ends 534 does not match the number of slots 524 shown in FIG. 20.

Space grooves 535 are formed by the clearances between respective upper coil ends 534 that contact brush 910. The shape of space grooves 535 are an approximate spiral that develops backwards in the rotating direction toward the outer diameter as shown in FIG. 25. By inclining space grooves 535 in such a manner, brush 910 contacts upper coil end 534 sequentially from the radially inner side toward the outer side at a high rotation speed. As a result, brush 910 that slides against upper coil end 534 does not jump on upper coil end 534.

Space grooves 535 of the clearances between each upper coil end 534 act as a cooling fan to cool the sliding surfaces of brush 910 and upper coil end 534. When armature coil 530 rotates, the centrifugal wind from space grooves 535 flows from the inner diameter to the outer diameter. The centrifugal wind generated by the rotation of each space groove 535 of upper coil end 534 that contacts brush 910 cools the heat generated by the sliding of brush 910 and upper coil end 534, and also acts to discharge brush powder to the outside.

Figure 26:
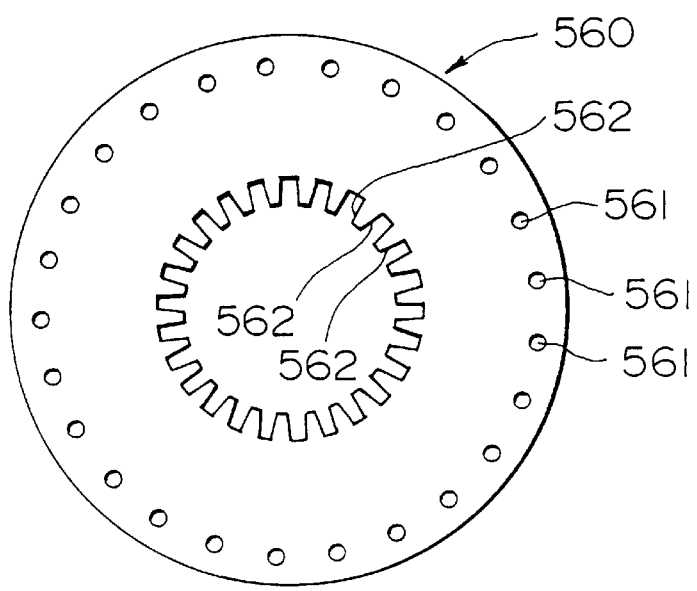
FIG. 26 is a front view depicting an insulation spacer.

Both upper coil ends 534 have small diameter projections 534a (FIG. 21) that project axially towards the surface where each end faces the other on the outer circumference. Projections 534a are disposed between upper coil end 534 and lower coil end 537, explained later, and are fit with holes 561 (equivalent to the positioning portion) formed on insulation spacer 560 (equivalent to the insulation body) that insulates upper coil end 534 and lower coil end 537 (FIG. 26). As with upper armature coil 531, lower armature coil 532 includes lower coil piece 536 composed of a material such as copper having an outstanding conductivity that is held in the outer circumference of slot 524, that extends in parallel to field magnetic pole 550, and that has two lower coil ends 537 that are bent inward from both ends of the lower coil piece 536 and that extend perpendicularly in the axial direction of the shaft 510. Lower coil piece 536 and both lower coil ends 537 can be integrally formed via cold casting, bent and formed in a U-shape with a press, or can be separately formed as lower coil piece 536 and two lower coil ends 537 that are connected by welding, etc., as with upper armature coil 531.

The insulation of each upper coil end 534 and each lower coil end 537 is ensured with insulation spacer 560. The insulation between each lower coil end 537 and armature core 520 is ensured with a resin (e.g., nylon or phenol resin) insulation ring 590 as shown in FIG. 19.

Figure 21:
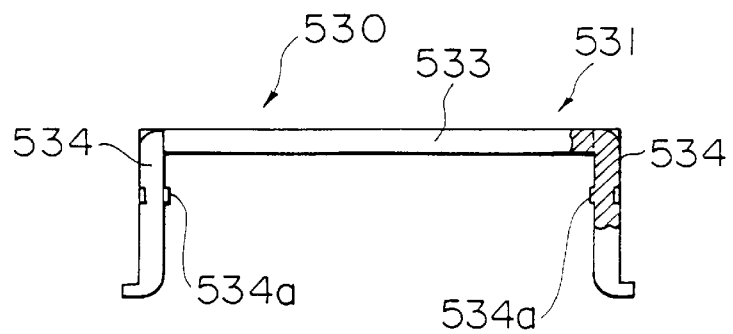
FIG. 21 is a view illustrating the side of an upper armature coil.
Figure 22:
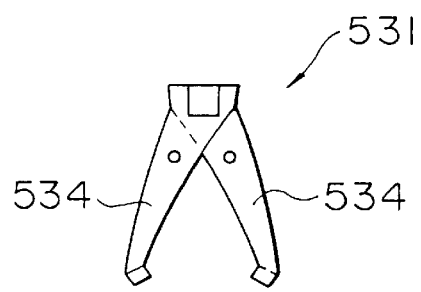
FIG. 22 is a front view illustrating the upper armature coil.

As with upper coil piece 533 shown in FIGS. 21 and 24, lower coil piece 536 is a linear bar with rectangular cross-section. This piece is firmly held in slot 524 with upper coil piece 533 as shown in FIG. 19 or FIG. 24. Lower coil piece 536 is covered with lower insulating film 105 (e.g., nylon or paper) and is stored in slot 524 with upper coil piece 533 covered with upper insulating film 125.

Of both lower coil ends 537, lower coil end 537 positioned on the front of the starter having the reduction mechanism is set to incline in a direction reverse of the inclined direction of upper coil end 534. Lower coil end 537 on the rear side is also set in a direction reverse to the inclined direction of upper coil end 534. Both lower coil ends 537 are inclined to the radial direction at the same angle to lower coil piece 536 and formed in the same shape. As with upper armature coil 531, with this structure even if lower coil ends 537 are turned 180° around the center of lower armature coil 532, lower armature coil 532 retains the same shape as if lower coil ends 537 are not turned. Thus, as there is no difference in the shape between lower coil ends 537, the assembly of lower armature coil 532 onto armature core 520 may be performed quicker and easier.

Each cross-sectional area of lower coil piece 536 and two lower coil ends 537 that form lower armature coil 532 are set smaller compared to the cross-sectional area of the upper coil piece 533 and two upper coil ends 534 that form upper armature coil 531. This is due to the fact that the entire length of upper armature coil 531 is longer than the entire length of lower armature coil 532, and if upper armature coil 531 and lower armature coil 532 have the same area, the electrical resistance of lower armature coil 532 will be lower than upper armature coil 531, and a difference will occur in the power supplied to upper armature coil 531 and lower armature coil 532. Thus, in this embodiment, lower armature coil 532 cross-sectional area was set to be less than the cross-sectional area of upper armature coil 531 to eliminate the difference in the electrical resistance between upper armature coil 531 and lower armature coil 532. This allows the power energized to each upper armature coil 531 and the power energized to each lower armature coil 532 to be the same, and the trouble of power being supplied mainly to the upper armature coil 531 is eliminated.

The cross-sectional area of lower coil piece 536 is shown to be larger than the cross-sectional area of upper coil piece 533 in FIG. 24, however, the main purpose of this illustration is to show the storage state of upper coil piece 533 and lower coil piece 536. Thus, the actual cross-sectional area of lower coil piece 536 is smaller than the cross-sectional area of upper coil piece 533.

Lower axial projection portion 539 that extends axially is created on the inner circumference ends of both lower coil ends 537. The outer circumference of lower axial projecting portion 539 fits with inner radial concave portion 562 formed on the inner circumference of insulation spacer 560, and is layered on the inner circumference of upper axial projection portion 538 of the inner end of upper coil end 534. The layered portion is electrically and mechanically connected with connection technology such as welding. The inner circumference of lower axial projecting portion 539 is insulated and disposed away from armature shaft 510.

Figure 27:
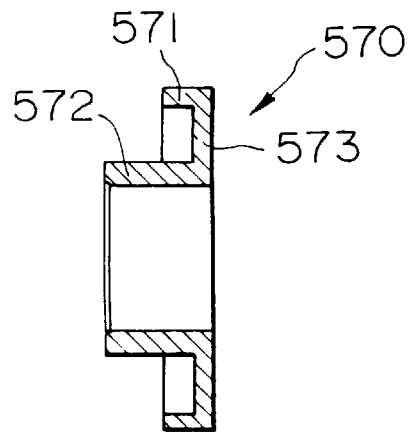
FIG. 27 is a cross-sectional view illustrating the side of a collar.
Figure 28:
FIG. 28 is a cross-sectional view illustrating the side of an insulation cap.

Upper axial projection portion 538 that extends axially is created on the inner circumference ends of both upper coil ends 534. Lower axial projection portion 539 on the inner end of lower armature coil 532 explained above is layered with the inner circumference of upper axial projection portion 538. These are electrically and mechanically connected with connection technology such as welding. The outer circumference of upper axial projection portion 538 contacts the inner surface of outer circumference ring portion 571 of fixing member 570 press-fixed onto armature shaft 510 with insulation cap 580 (FIGS. 27 and 28).

Insulation spacer 560 is a thin plate ring made of resin (e.g., epoxy resin, phenol resin, nylon). Multiple holes 561 (equivalent to positioning portion) into which projections 534a of upper coil ends 534 fit are formed on the outer circumference as shown in FIG. 26. Inner radially concave portions 562 into which lower radially projection portions 539 on the inner side of lower coil ends 537 fit are formed on the inner circumference of insulation spacer 560. As explained later, holes 561 and inner radially concave portions 562 are used for positioning and fixing armature coil 530.

Collar 570 is an iron ring-shaped body. As shown in FIG. 27, collar 520 comprises inner ring-shaped portion 572 press-fit onto armature shaft 510, restricting ring 573 extending in the radial direction to prevent upper coil ends 534 and lower coil ends 537 from widening in the axial direction, and outer ring-shaped portion 571 housing upper inner projecting portions 538 of upper coil ends 534 to prevent the internal diameter of armature coil 530 from enlarging due to the centrifugal force. Collar 570 here has disc-shaped insulation cap 580 made of resin (e.g., nylon), illustrated in FIG. 28, at the ends of upper coil end 534 and lower coil end 537 for electrical insulation.

Collar 570 disposed in front of the starter having the reduction mechanism contacts the rear of motor wall 800, which is positioned in front of collar 570 to function as a thrust pad for restricting the forward movement of armature 540. Collar 570 disposed at the back of the starter having the reduction mechanism contacts the front of brush holding member 900 to function as a thrust pad from restricting the backward movement of armature 540.

Each collar 570 fixing the inner end portions of armature coil 530 function as thrust pads for armature coil 530 as described above, so there is no need to provide any special thrust pad for armature 540. This allows the number of parts required for the starter having the reduction mechanism in addition to the number of assembling man-hours for each such starter to be reduced.

Slot 524 and fixing claw 525, insulation spacer 560, hole 561, inner radially concave portion 562, and collar 570 press-fit into armature shaft 410 are provided as means to position and fix the upper armature coil 531 and lower armature coil 532 of armature coil 531 to the armature core 530.

Slot 524 of armature core 520 houses the upper coil piece 533 and lower coil piece 536, and by bending the fixing claws 525 toward the inside diameter as shown by the arrows in FIG. 24, upper coil piece 533 and lower coil piece 536 are firmly fixed into each slot 524 so that movement of upper coil piece 533 and lower coil piece 536 toward the outer diameter due to centrifugal force can be prevented. As the outer circumference surface of the upper coil piece 533 is insulated from lower insulating film 105 and upper insulating film 120 layers, sufficient insulation can be maintained even when the fixing claws are forcibly bent inward.

Inner radially concave portions 562, formed on insulation spacer 560 and in which lower projecting portions 539 are fit, position lower coil ends 537. Portion 562 also prevent lower coil ends 537 from moving toward the outer diameter due to the centrifugal force applied on the lower coil ends 537.

Holes 561 formed on the outer circumference of insulation spacer 560 having projections 534a of upper coil ends 534 fit therein, position upper coil ends 534. Holes 561 also prevent the upper coil ends 534 from moving toward the outer diameter due to the centrifugal force applied on upper coil ends 534.

Collar 570 hold upper inner projection portion 538 and lower inner projection portion 539 joined to prevent the movement of the inside diameter portion of armature coil 530 toward the outside diameter due to the centrifugal force applied. Collars 570 also restrict the movement of the axial end portion of upper inner projecting portion 538 and lower inner projecting portion 539 joined to prevent elongation of the axial length of armature coil 530. To prevent the elongation of the axial length of upper coil ends 534 and lower coil ends 537 when the starter having the reduction mechanism operates, an extra space within the starter must be secured in the starter with reduction mechanism to accommodate the elongation. In this embodiment, however, the collars 570 prevent the elongation of the axial length of upper coil ends 534 and lower coil ends 537 so the starter having the reduction mechanism does not require any extra space. This allows, the axial length of the starter having the reduction mechanism to be shortened.

Next, the procedure for assembling armature coil 530 will be explained.

First, armature core 520 including stacked core plates 521 is press-fit around armature shaft 510. Next, the insulation rings 590 are disposed at both sides of armature core 520.

Then, lower coil pieces 536 of lower armature coil 532 are stored with lower insulating film 105 into each slot 524. Then, insulation spacers 560 are mounted on both sides of lower coil ends 537 of lower armature coil 532, and lower axial projection portions 539 are arranged within each inner radially concave portion 562. This completes the positioning of lower armature coil 532.

Next, the upper coil pieces 533 of the upper armature coil 532 are stored with the upper insulating film 125. At this time, the projections 534a on each upper coil end 534 are fit into the holes 561 on the insulation spacer 560. This completes the positioning of the upper armature coil 531.

Upper axial projection portions 538 and lower axially projection portions 539 are electrically and mechanically connected with connection technology such as welding. Then, each fixing claw 525 of armature core 520 is bent toward the inner circumference to fix upper coil piece 533 and lower coil piece 536 into each slot 524. Collars 570 are then press-fit onto armature shaft 510 to fix the inner circumference end portions of armature coils 530.

This completes the assembly of the armature.

In this armature 540, upper coil ends 534 on both ends of upper armature coil 531 and lower coil ends 537 on both ends of lower armature coil 532 that form armature coil 530 are each set to be perpendicular to the axial direction of armature shaft 510. This allows the axial length of armature 540 to be shortened, and as a result the starter with reduction mechanism is smaller compared to conventional models.

Furthermore, in this embodiment, as the magnet switch is placed in the space created by shortening the axial length of starter motor 500 and the space created by eliminating the independent commutator, the axial length of the starter having a reduction mechanism does not differ much from the conventional model. However, as the space for the magnet switch 600 conventionally mounted on top of starter motor 500 is not required, the volume of the starter with a reduction mechanism is dramatically smaller than the conventional model.

As the axial length of armature coil 530 is shortened, the resonance frequency of armature 540 can be set higher, and jumping, etc., of the brush due to vibration of the armature 540 can be prevented.

Furthermore, as the axial length of upper coil end 534 and lower coil end 537 of armature coil 530 is short, and upper coil piece 533, lower coil piece 536, upper coil end 534, and lower coil end 537 are firmly fixed to armature core 520 and armature shaft 510, trouble such as armature coil 530 deviating from armature core 520 due to centrifugal force will not occur even if armature 540 is rotated at a high speed.

Figure 29:
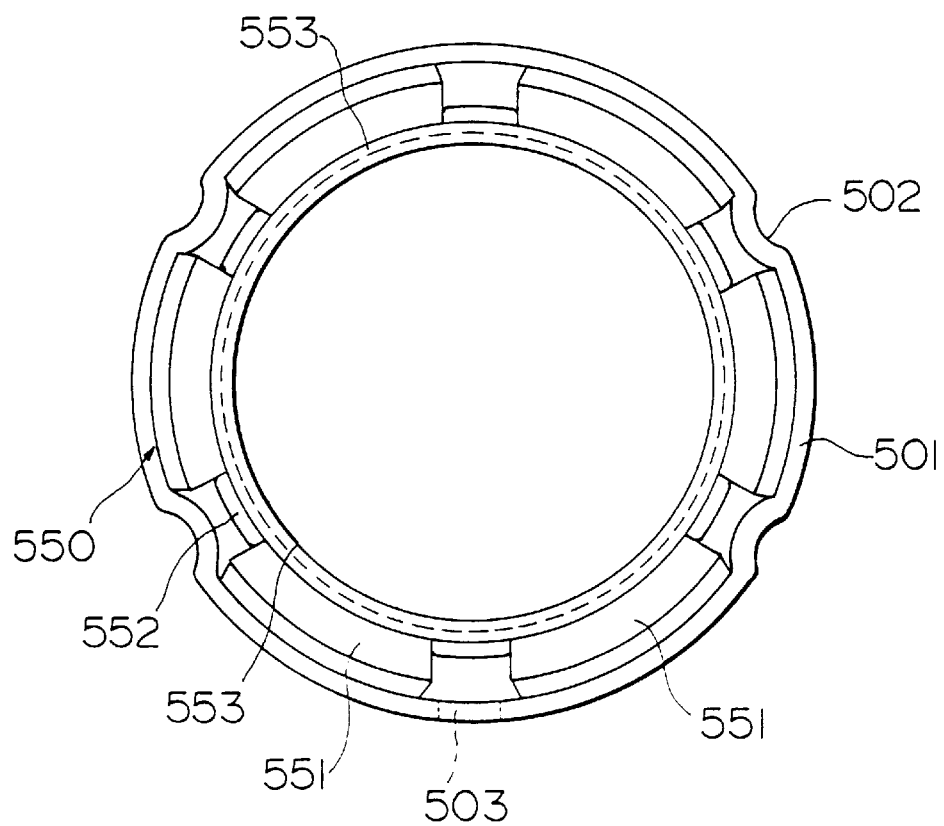
FIG. 29 is a front view of a yoke.
Figure 30:
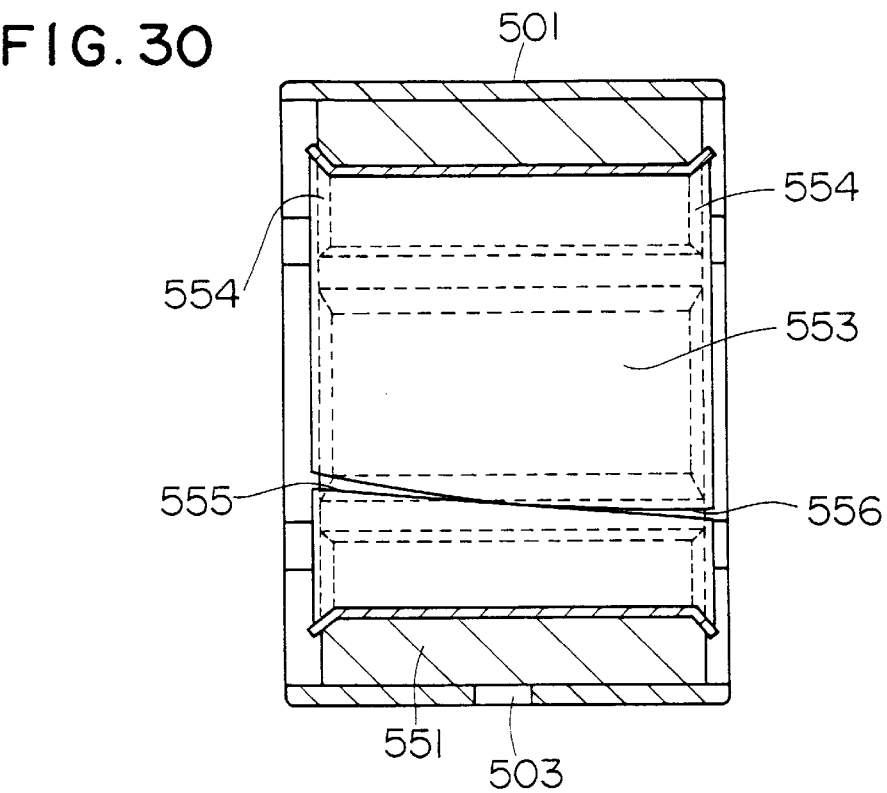
FIG. 30 is a cross-sectional view illustrating the side of the yoke.

As shown in FIGS. 29 and 30, yoke 501 having a discharge hole 503 is a cylindrical body formed by rounding a steel plate. Multiple concave grooves 502 that extend axially and face the inner circumference are formed on the circumference. Concave grooves 502 are used to arrange the through bolts and also to position the field magnetic pole 440 within the inner circumference of yoke 501.

In this embodiment, field magnetic pole 550 is configured of multiple (e.g., six) main (primary) magnetic poles 551 as shown in FIG. 29, and inter-pole (auxiliary) magnetic poles arranged between the main magnetic poles 551. Field coils that generate a magnetic force electrically can be used instead of the permanent magnets.

Main magnetic poles 551 are positioned by both ends of the inner side of concave grooves 502 on yoke 501 described above. These are fixed to the inside of yoke 501 by fixing sleeve 553 arranged on the inner circumference of field magnetic pole 550, with the inter-pole magnetic poles arranged between the main magnetic poles.

Fixing sleeve 553 is a nonmagnetic (e.g., aluminum) sheet that has been round-machined. Both ends 554 in the axial direction are bent to face the outer diameter, and to prevent field magnetic poles 550 from deviating in the axial direction of yoke 501. As shown in FIG. 30, fixing sleeve 553 has two end pieces 555 and 556 (first end portion and second end portion) that abut inside field magnetic poles 550. One of end pieces 555 is set to be linearly inclined to the axial direction, and end piece 556 is set to gradually curve and incline to the axial direction.

By setting one end piece 555 linearly and the other end piece 556 at a curve, even if a slight error occurs in the inner dimensions of field magnetic poles 550, fixing sleeve 554 can be enlarged to the outer diameter side by axially deviating the butt position of one end piece 555 and other end piece 556 to absorb this error. As a result, the diameter dimensions of fixing sleeve 554 are fixed, so field magnetic poles 550 are firmly held between fixing sleeve 553 and yoke 501.

It is to be noted that, the discharge hole 503 is formed to face the lowermost one of the inter-pole magnetic poles 552 each interposed between the adjacent two of the circumferentially arranged main magnetic poles 551. Thus, the magnetic pole 552 and the sleeve 553 facing the discharge hole 503 prevents the water or other foreign particle from entering inside the starter motor 500 directly.

Figure 31:
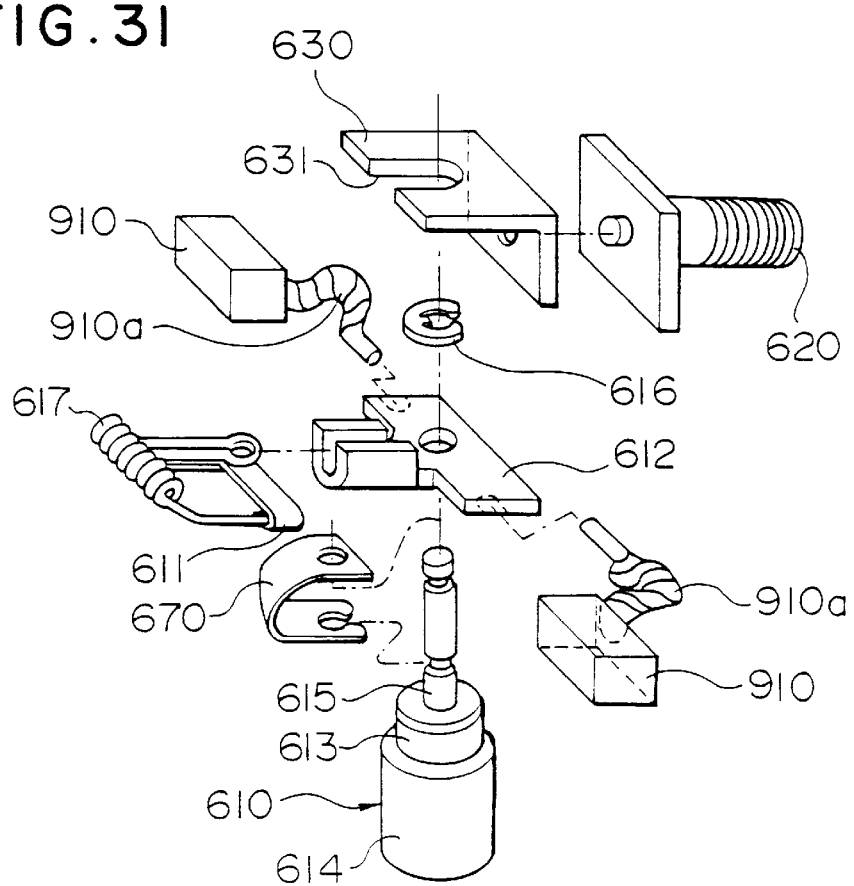
FIG. 31 is an exploded view showing a magnet switch plunger and fixed contact.
Figure 32:
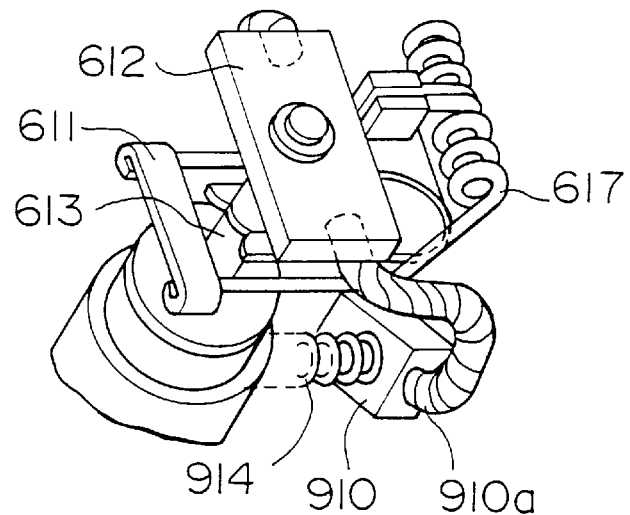
FIG. 32 is a perspective view illustrating the magnet switch plunger.

As shown in FIGS. 1, 31 and 32, the magnet switch 600 is held by the brush holding member 900, explained later, and is arranged in end frame 700, explained later. Magnet switch 600 is fixed to be approximately perpendicular to armature shaft 510.

With electrical conductivity, magnet switch 600 drives plunger 610 upward, and contacts the two contacts (lower movable contact 611 and upper movable contact 612) that move integrally with plunger 610 to sequentially contact with head 621 of terminal bolt 620 and contact portion 631 of fixed contact 630. The battery cable, not illustrated, may be connected to terminal bolt 620.

Magnet switch 600 is configured inside magnet switch cover 640, which is a magnetic (e.g., iron) tube with base. Magnet switch cover 640 is formed by pressing a mild steel plate into a cup shape for example, and has hole 641 at the center of the base for passing plunger 610 freely in the vertical direction. The upper opening of magnet switch cover 640 is plugged by magnetic (e.g., iron) stationary core 642.

Stationary core 642 is configured of upper large diameter portion 643, lower middle diameter portion 644 and lower small diameter portion 645. The outer circumference of larger diameter portion 643 tightens the upper end of magnet switch cover 640 to the inner side so that stationary core 642 is fixed in the upper opening of magnetic switch cover 640. The upper end of attraction coil 650 is mounted to the periphery of middle diameter portion 644. The upper end of compressed coil spring 660 that energizes plunger 610 downward is mounted onto the outer circumference of small diameter portion 645 of stationary core 642.

Attraction coil 650 is an attraction means for pulling plunger 610 closer, and is magnetized when power is passed through it. The upper end of attraction coil 650 is mounted on middle diameter portion 644 of stationary core 642, and has sleeve 651 that slides and freely covers plunger 610 in the vertical direction. Sleeve 651 is made by round-machining a nonmagnetic (e.g., copper, brass, stainless steel) thin plate, and insulation washers 652 made of resin, etc., are set on the upper and lower ends of sleeve 651. An insulating film (not illustrated) made of a thin resin (e.g., cellophane, nylon film) or paper is wound around the periphery of sleeve 651 between insulation washers 652. Furthermore, a fine enamel wire is wound a designated number of times around the periphery of the insulating film to configure attraction coil 650.

Plunger 610 is made of a magnetic metal (e.g., iron), and has a columnar-shape that has upper small diameter portion 613 and lower large diameter portion 614. The lower end of compression coil spring 660 is mounted to small diameter portion 613, and large diameter portion 614, having a relatively long axial direction, is held so that it can move vertically inside sleeve 651.

Plunger shaft 615 that extends upward from plunger 610 is fixed on the upper side of plunger 610. Plunger shaft 615 protrudes upward from the through hole on the center of stationary core 642. Upper movable contact 612, which slides freely through the vertical direction along plunger shaft 615, is disposed on the upper side of plunger shaft 615 above stationary core 642.

Upper movable contact 612 is restricted from moving over the upper end of plunger shaft 615 by fixing ring 616 installed on the upper end of plunger shaft 615 as shown in FIG. 31. As a result, upper movable contact 612 slides freely in the vertical direction along plunger shaft 615 between fixing ring 616 and stationary core 642. Upper movable contact 612 is constantly energized upwards by contact pressure spring 670 formed by the plate spring installed on plunger shaft 615.

Upper movable contact 612 is composed of a metal such as copper having an outstanding conductivity. When upper movable contact 612 moves upward, both contact portions 631 on fixed contact 630 are contacted by the ends of contact 612. Each lead wire 910*a* for brushes 910 is electrically and mechanically connected with caulking or welding to upper movable contact 612. The ends of resistors 617 that act as multiple restriction means (two in this embodiment) are inserted and electrically and mechanically fixed to the grooves on upper movable contact 612. Each lead wire 910*a* for brushes 910 is electrically and mechanically connected with caulking or welding to upper movable contact 612, however, upper movable contact 612 and each lead wire 910*a* of brush 910 can be integrally formed.

Resistor 617 is used to slow rotation of starter motor 500 when the starter having a reduction mechanism initially starts. Metal wires with a large resistance value are wound to configure the resistor 617. Lower movable contact 611 disposed below head portion 621 of terminal bolt 620 is fixed with caulking, etc., to the other end of resistor 617.

Lower movable contact 611 is composed of a metal such as copper having an outstanding conductivity. This contacts the upper surface of stationary core 642 when magnet switch 600 stops and plunger 610 is at the lower position. When resistor 617 moves upward with the movement of plunger shaft 615, lower movable contact 611 will contact head portion 621 of terminal bolt 620 before upper movable contact 612 contacts contact portion 631 of fixed contact 630.

Concave portion 682 is formed on the bottom side of plunger 610 to store spherical body 681 set on the rear end of string-shaped member 680 (e.g., wire). Male screw 683 is formed on the inner wall of concave portion 682, and fixing screw 684 that fixes spherical body 681 is screwed into male screw 683. The length of the string-shaped member 680 is adjusted by adjusting the amount that fixing screw 684 is screwed into male screw 683. The length of string-shaped member 680 is adjusted so that when plunger shaft 615 moves upward and lower movable contact 611 contacts terminal bolt 620, restricting claw 231 of pinion rotation restricting member 230 fits into notch 214 on the outer circumference of pinion gear 210. Male screw 683 and fixing screw 683 act as adjustment mechanism.

Figure 33:
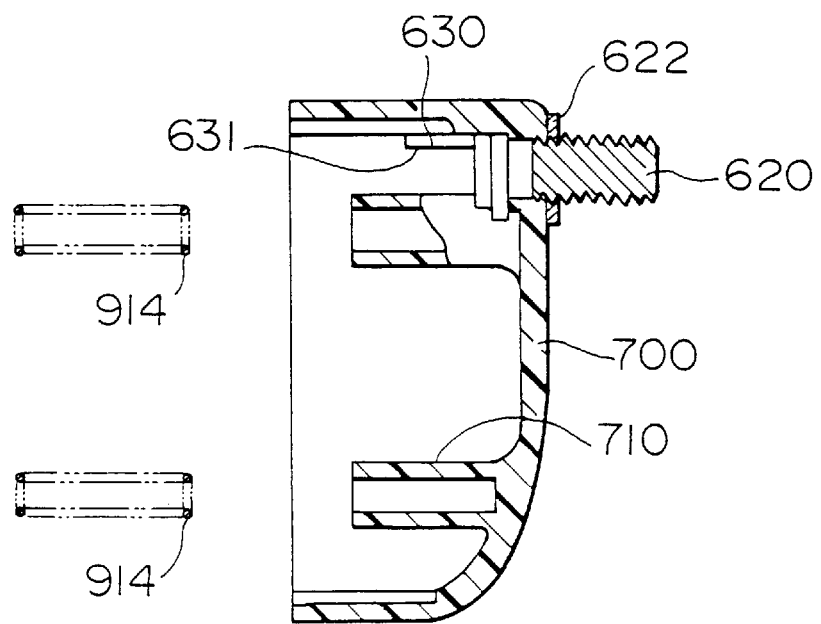
FIG. 33 is a cross-sectional view illustrating an end frame and brush spring.
Figure 34:
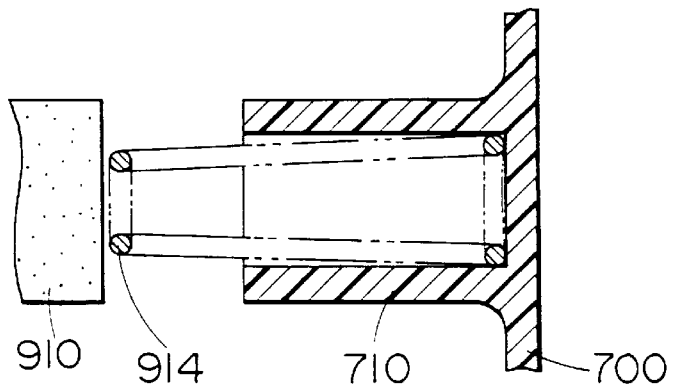
FIG. 34 is a side view illustrating part of the end frame, and part of the brush spring and brush.

As shown in FIGS. 33 and 34, the end frame 700 is a magnet switch cover made of resin such as phenol resin. Magnet switch 600 is stored inside end frame 700.

Spring holding poles 710 that hold compressed coil spring 914, which energize brushes 910 toward the front is installed on the rear side of end frame 700 to protrude forward according to the position of brushes 910. Each compressed coil spring 914 is tapered as shown in FIG. 34, and the diameter of the side inserted into the spring holding column 710 is wider than the side protruding from column 710. Thus, compressed coil spring 914 is fixed and held inside spring holding column 710. Spring holding column 710 can be tapered and the diameter of the side in which compressed coil spring 914 is inserted can be increased instead. Compressed coil spring 914 is disposed so as to overlap the radial direction outer circumference to the axial direction of plunger 610 of magnet switch 600 as shown in FIG. 1.

Terminal bolt 620 is an iron bolt inserted from inside end frame 700 to project from the rear of end frame 700, and has head portion 621 on the front that contacts the inner surface of end frame 700. Terminal bolt 620 is fixed to end frame 700 by installing caulking washer 622 on terminal bolt 620 projecting from the rear of end frame 700 as shown in FIG. 33.

Copper fixed contact 630 is caulked and fixed onto the front end of terminal bolt 620. Fixed contact 630 has one or multiple (six in this embodiment) contact portions 631 positioned on the inner upper end of end frame 700. The upper surface of upper movable contact 612 that moves vertically with magnet switch 600 operation is set to contact the lower surface of contact portion 631.

Brush holding member 900 separates the inner side of yoke 501 and inner side of end frame 700 and functions to rotatably support the end of armature shaft 510 via brush holder bearing 564. In addition, brush holding member 900 can act as the brush holder, can support magnet switch 600, and can hold pulley 690 that guides string-shaped member 680. Brush holding member 900 has a hole, not illustrated, through which string-shaped member 680 passes.

Figure 35:
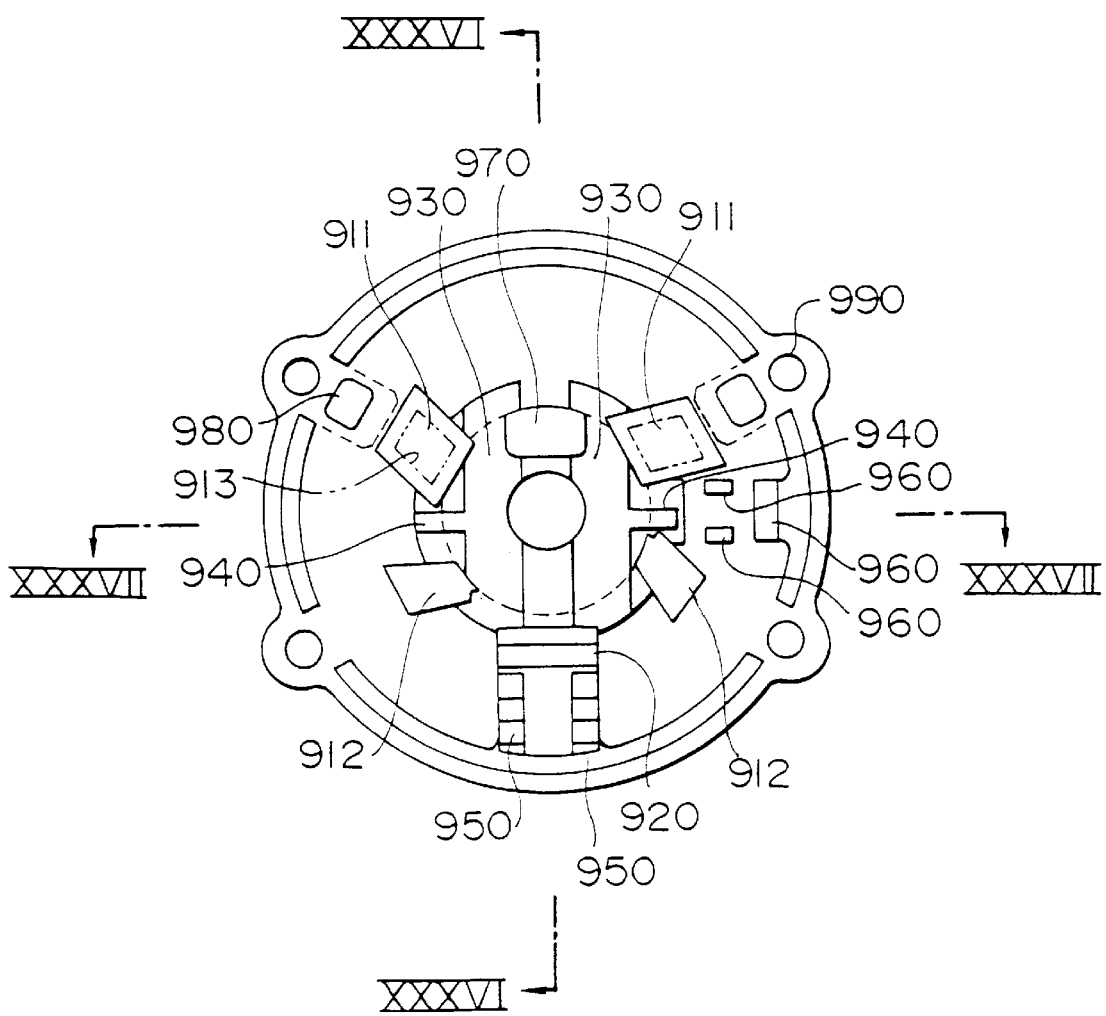
FIG. 35 is a front view illustrating a brush holding member.
Figure 37:
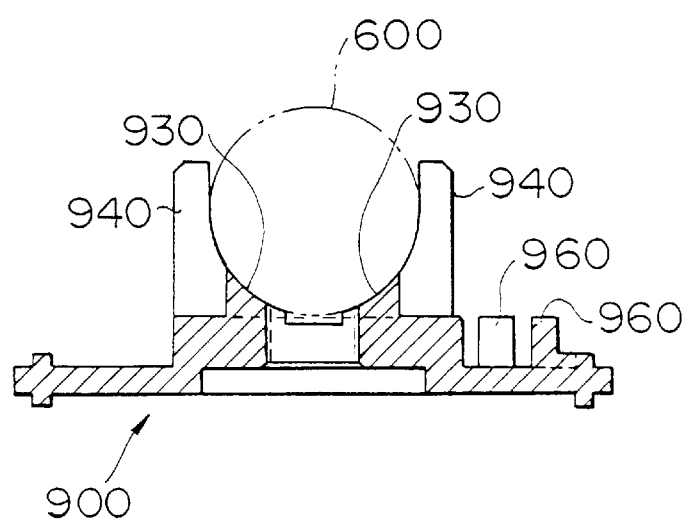
FIG. 37 is a cross-sectional view following the XXXVII—XXXVII line in FIG. 35.

Brush holding member 900 is a partition made of cast metal such as aluminum. As shown in FIGS. 35 and 37, there are multiple brush holding holes 911 and 912 (two on top and two on bottom in this embodiment) that hold brushes 910 in the axial direction.

Figure 36:
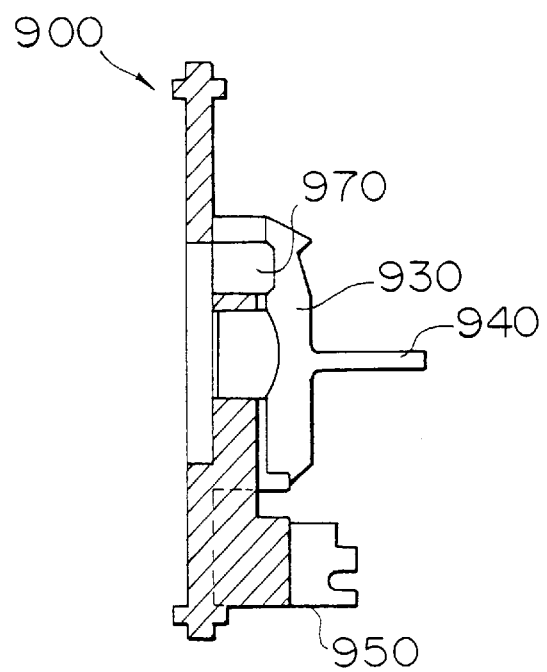
FIG. 36 is a cross-sectional view following the XXXVI—XXXVI line in FIG. 35.

Upper brush holding hole 911 is a hole that holds brush 910 that receives a positive voltage, and upper brush holding hole 911 holds brush 910 via a resin (e.g., nylon, phenol resin) insulation cylinder 913. FIG. 36 illustrates a cross-sectional view taken along the line XXXVI—XXXVI in FIG. 35 while FIG. 37 is a cross-sectional view along the line XXXVII—XXXVII in FIG. 35. Lower brush holding hole 912 is a hole that holds brush 910 connected to the ground, and lower brush holding hole 912 directly holds the brush 910 inside the hole.

Brush 910 is formed by forming metallic powder such as graphite powder or copper powder and a crystallizing resin in a shape having approximately a rectangular cross-sectional shape, and is then baked.

Lead wire 910a is connected to the side of the rear end of brush 910 by welding, etc. As lead wire 910a is connected to the side of the rear end of brush 910, the effective length of brush 910 can be long. When brush 910 is a surface-type brush 910 that energizes the brush in the axial direction such as in this embodiment, the length of brush 910 affects the entire length of the starter having the reduction mechanism. Therefore, using the brush 910 in this embodiment that can suppress the axial length of the brush and have a longer effective brush length is especially effective.

The front end of brush 910 is energized by compressed coil spring 914 to the rear side of upper coil end 534 on the rear side of armature coil 530. Lead wire 910a of brush 910 is electrically and mechanically connected by welding or caulking, etc., to upper movable contact 612 that moves with magnet switch 600. Lead wire 910a of lower brush 910 is electrically and mechanically connected by caulking to concave notch 920 formed on the rear side of brush holding member 900. In this embodiment, there is one pair of lower brushes 910, with each of brushes 910 connected to one lead wire 910a. The center of lead wire 910a is caulked to concave notch 920 on the rear side of brush holding member 900.

Two washers 930 to which the front end side of magnet switch 600 contact and two fixing columns 940 that enclose the periphery of magnet switch 600 are formed on the rear side of brush holding member 900. As washers 930 contact magnet switch 600, which has a cylindrical outer diameter, washers 930 are set to match the outer shape of magnet switch 600. Fixing columns 940 are caulked to the inner side of the rear end in the state with magnet switch 600 contacting washers 930 to hold magnet switch 600.

Pulley holding portion 950 that holds pulley 690, which converts the movement direction of string-shaped member 680 from the vertical direction of magnet switch 600 to the axial direction, is formed on the lower rear side of brush holding member 900.

Holding portion 960 holds the temperature switch (not illustrated) for overheat protection. Holding portion 960 is formed on the rear side of brush holding member 900. Holding portion 960 holds the temperature switch between upper brush holding hole 911 and lower brush holding hole 912 so that it is near magnet switch 600. When this temperature switch reaches a predetermined temperature, magnet switch 600 turns OFF, and the power to the starter motor having a reduction mechanism is cut off to protect the equipment.

The front side of brush holding member 900 is set to be near the rear side of upper coil end 534 that contacts with brush 910. Therefore, the centrifugal wind generated by the rotation of space grooves 535 between each upper coil end 534 is forcibly guided in the outer radial direction. In other words, a centrifugal wind is generated between the rear side of upper coil end 534 and brush holding member 900.

As shown in FIG. 39, a cooling air passage is formed in the starter having the reduction mechanism for guiding air to the inner side of the space between the rear side of upper coil end 534 and brush holding member 900, and to discharge the centrifugal wind to the external environment. This cooling air passage is configured of guiding inlet 970 opened into the inner circumference portion of brush holding member 900 and which guides the air in end frame 700 to the inner side between rear upper coil end 534 and brush holding member 900, the inner portion of end frame 700, brush holding member communicating holes 980 formed on the upper periphery of brush holding member 900 and that communicate with the clearances between main magnetic poles 551 in yoke 501, the clearance between main magnetic poles 551 that communicate with brush holding member communicating holes 980, communicating hole 810 formed in the upper periphery of the motor wall 800 and that communicates with the clearance between the main magnetic poles 551, notched portion 363 on the upper side of center bracket 360 that communicates with motor wall communicating hole 810, and the inside of the housing 400.

The air drawn in from opening portion 410 of housing 400 passes via the inside of housing 400 to notched portion 363 on the upper side of the center bracket 360 through motor wall communicating hole 810 through the clearance between main magnetic poles 551 through brush holding member communicating hole 980 and then circulates inside end frame 700 to guide inlet 970, and then flows to the inner side of the space between the rear side of upper coil end 534 and brush holding member 900.

The centrifugal force generated between the rear side of upper coil end 534 and brush holding member 900 cools the sliding surface and periphery of brush 910, and is then discharged with the brush powder generated on the sliding surface through discharge hole 503 formed in the bottom end of yoke 501 and then exits the starter having the reduction mechanism.

As explained, upper coil end 534 that functions as a commutator also functions as a centrifugal fan to generate a centrifugal wind. By that, the temperature of the sliding portion between upper coil end 534 and brush 910 can be maintained at a low level. As the brush powder generated due to wearing of brush 910 is carried to the discharge hole 503 by the centrifugal wind and is then discharged through hole 503, trouble or problems that may be caused by accumulation of brush powder in the operational mechanisms of the present invention can be prevented.

Figure 38A:
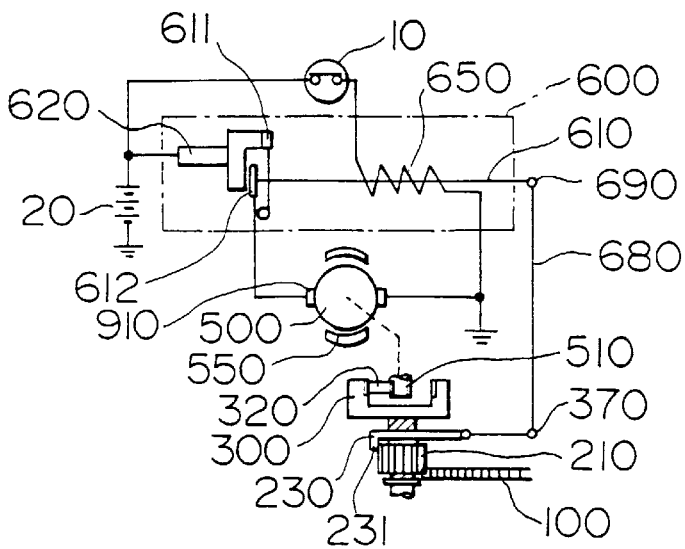
FIGS. 38A, 38B and 38C are electrical circuit diagrams indicating the state with the pinion operating.
Figure 38B:
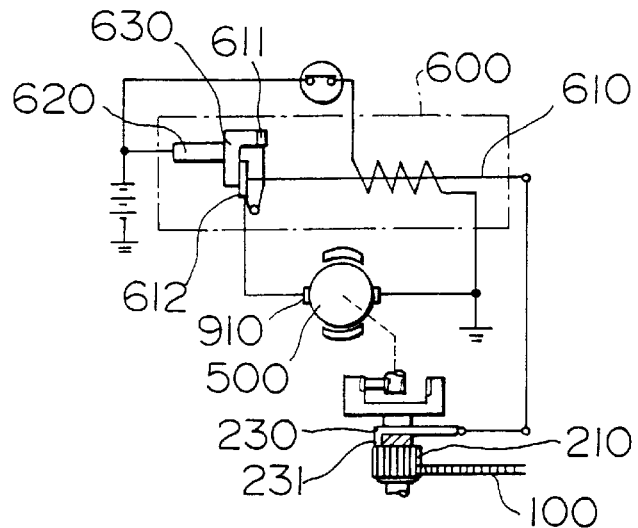
Figure 38C:
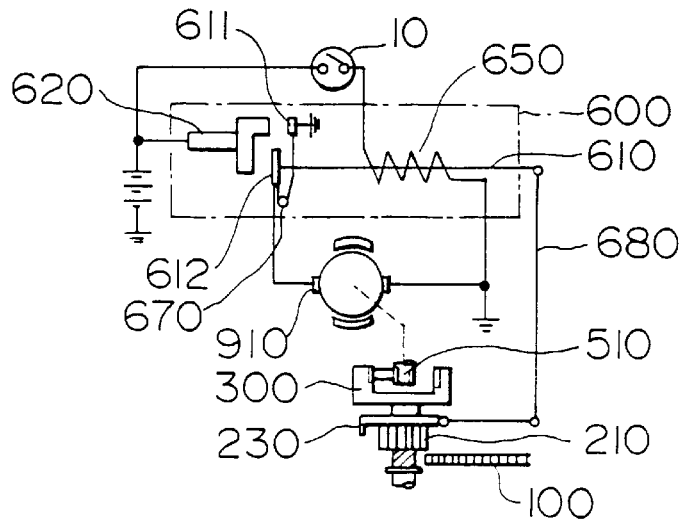

Next, operation of the above starter will be explained according to the electrical circuit diagrams shown in FIGS. 38A through 38C.

When key switch 10 is set to the start position by the operator, attraction coil 650 in magnet switch 600 is energized by battery 20. When attraction coil 650 is energized, plunger 610 is attracted by the magnetic force generated by attraction coil 650 so that it is lifted upward.

When plunger 610 starts to rise, upper movable contact 612 and lower movable contact 611 also rise, and the rear end of string-shaped member 680 also rises. When the rear end of the string-shaped member rises, the forward end of string-shaped member 680 is pulled downward, and pinion rotation restriction member 230 lowers. When pinion rotation restriction member 230 lowers, and restriction claw 321 engage with one of notches 214 on the circumference of pinion gear 210, lower movable contact 611 contacts head 621 of terminal bolt 620 as depicted in FIG. 38A. The voltage from battery 20 is applied to terminal bolt 620, and the voltage of terminal bolt 620 is conveyed to upper brush 910 via lower movable contact 611, resistor 617, upper movable contact 612 and lead wire 910a. In other words, the low voltage conveyed with the resistor 617 is conveyed to armature coil 530 via upper brush 910. As lower brush 910 is constantly grounded via brush holding member 900, armature coil 530 configured with upper armature coils 531 and lower armature coils 532 combined into a coil is energized with a low voltage. Armature coil 530 then generates a relatively weak magnetic force. This magnetic force acts on (attracts or repulses) the magnetic force of field magnetic poles 550, causing the armature 540 to rotate at a low speed.

When armature shaft 510 rotates, the planetary gears 320 in epicycle gear reduction mechanism 300 are rotated and driven by sun gear 310 on the front end of armature shaft 510. If planetary gears 320 apply the rotary torque of the direction wherein ring gear 100 is rotated and driven to internal gear 340 via planet carrier 330, the rotation of internal gear 340 will be restricted by the function of the overrunning clutch 350. In other words, internal gear 340 will not rotate, so the planet carrier 330 will decelerate and rotate due to the rotation of the planetary gear 320. If planet carrier 330 rotates, pinion gear 210 will also attempt to rotate, but as the rotation of pinion gear 210 is restricted by the pinion rotation restriction member 230, pinion gear 210 will advance along helical spline 221 of output shaft 220.

When pinion gear 210 advances, shutter 420 will also advance causing opening of opening 410. With the advance of pinion gear 210, pinion gear 210 will completely engage with engine ring gear 100, and then will contact pinion fitting ring 250. When pinion gear 210 advances, restriction claw 231 will be disengaged from notch 214 on pinion gear 210, and then restriction claw 231 will drop behind washer 215 installed on the rear surface of the pinion gear 210.

On the other hand, when pinion gear 210 is advanced, upper movable contact 612 contacts contact portion 631 of fixed contact 630. The battery voltage of terminal bolt 620 will be directly conveyed to upper brush 910 via upper movable contact 612 and lead wire 910a. In other words, a high current will flow to armature coil 530 configured of each upper armature coil 531 and each lower armature coil 532. Armature coil 530 generates a large magnetic force, and rotates armature 540 at a high speed.

The rotation of armature shaft 510 is decelerated by epicycle gear reduction mechanism 300 thus increasing the rotational torque, and planet carrier 330 will be rotated and driven. At this time, the front end of pinion gear 210 will contact pinion fitting ring 250, and will rotate together with the planet carrier 330. Pinion gear 210 is engaged with engine ring gear 100, so pinion gear 210 will rotate and drive ring gear 100 thereby rotating and driving the engine output shaft.

Next, when the engine starts and engine ring gear 100 rotates faster than pinion gear 210, a force to retract pinion gear 210 will occur due to the function of the helical spline. The retraction of pinion gear 210 will be prevented by rotation restriction claw 231 that has dropped behind pinion gear 210, and will prevent early separation of pinion gear 210. Thus, the engine can be accurately started. This situation is shown in FIG. 38B.

When ring gear 100 rotate faster than pinion gear 210 due to the starting of the engine, pinion gear 210 will be rotated and driven by the rotation of ring gear 100. The rotational torque conveyed to pinion gear 210 from ring gear 100 will be conveyed via planet carrier 330 to pins 332 that support planetary gears 320. In other words, planetary gears 320 are driven by planet carrier 330. As a torque rotating in reverse of that when the motor is started will be applied to internal gear 340, overrunning clutch 350 will allow rotation of ring gear 100. In other words, when a torque rotating in a direction reverse to that when the motor is started is applied to internal gear 340, rollers 353 of overrunning clutch 340 will separate from concave notches 355 on clutch inner member 352, and rotation of internal gear 340 will be possible.

When the engine starts, the relative rotation wherein ring gear 100 rotate and drive pinion gear 210 will be absorbed by overrunning clutch 350 and armature 540 will not be rotated by the engine.

After the engine has been started, key switch 10 is removed from the start position by the operator, and the conductivity to attraction coil 650 in magnet switch 600 is stopped. When the energizing the attraction coil 650 is stopped, plunger 610 will return downward due to the function of compressed coil spring 660.

Upper movable contact 612 will be separated from contact portion 631 of fixed contact 630, and then lower movable contact 611 will also be separated from head portion 621 of terminal bolt 620 causing the conductivity to upper brush 910 to be stopped.

When plunger 610 is returned downward, pinion rotation restriction member 230 will return upward due to the function of return spring 236, and restriction claw 231 will be separated from behind pinion gear 210. Pinion gear 210 will be returned backwards by the function of return spring 240, and the engagement of pinion gear 210 and ring gear 100 will be disengaged. At the same time, the rear end of pinion gear 210 will contact flange-shaped projection portion 222 on the output shaft. In other words, pinion gear 210 is returned to the position before the starter started. This situation is shown in FIG. 38C.

When plunger 610 is returned downward, lower movable contact 611 contacts upper surface of stationary core 642 on magnet switch 600, and the lead wires on upper brush 910 are conducted in the order of upper movable contact 612, resistor 617, lower movable contact 611, stationary core 642, magnet switch cover 640 and brush holding member 900. In other words, upper brush 910 and lower brush 910 are short-circuited via the brush holding member 900. On the other hand, an electromotive force is generated in armature coil 530 by the coasting rotation of armature 540. This electromotive force is short circuited via upper brush 910, brush holding member 900 and lower brush 910, and thus a braking force is applied on the coasting rotation of armature 540. As a result, the armature 540 stops in a short time.

SECOND EMBODIMENT

Figure 40:
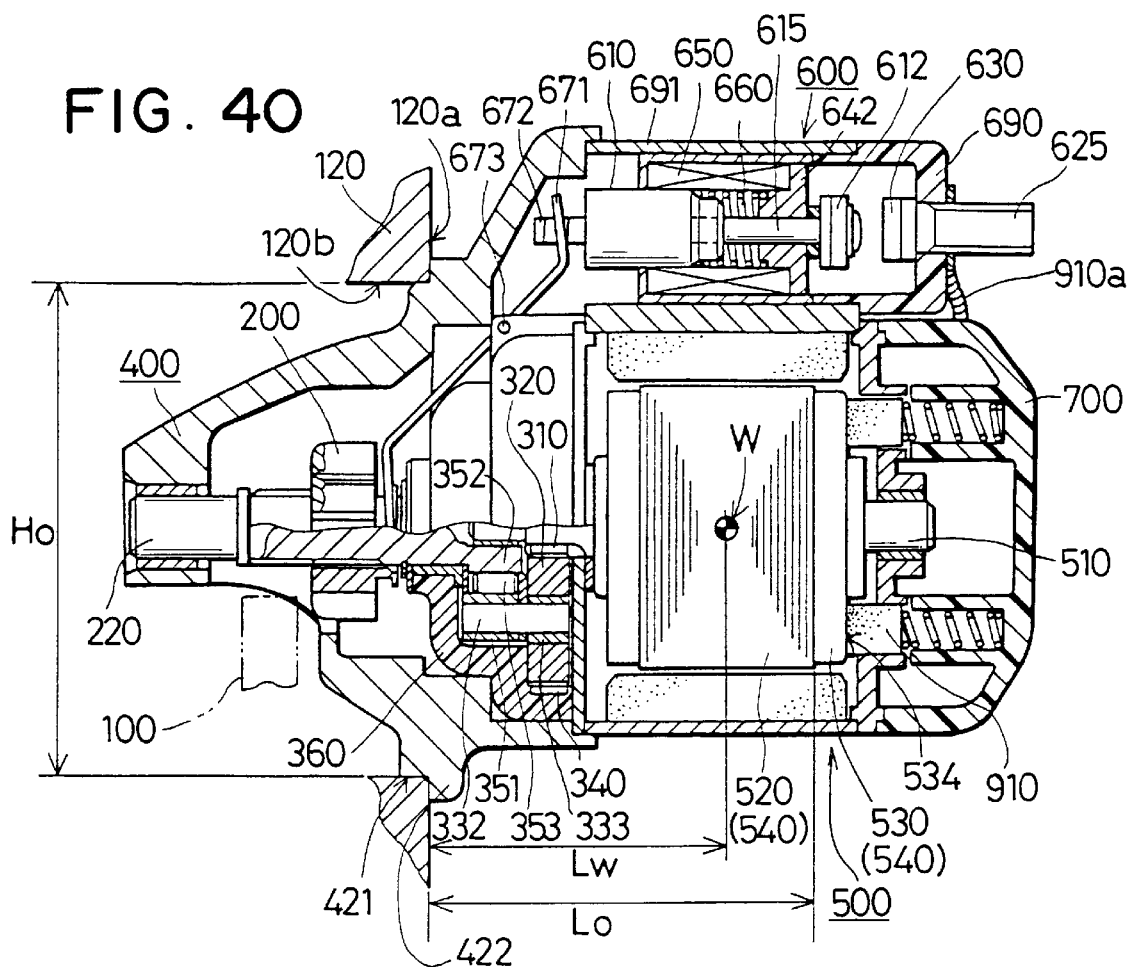
FIG. 40 is a cross-sectional view of a starter according to the second embodiment of the present invention.

The starter according to the second embodiment has, as shown in FIG. 40, housing 400 encasing output shaft 220, pinion 200, an epicycle speed reduction mechanism and an overrunning clutch, starter motor 500, magnet switch 600 and end frame 700. In the similar manner as in the first embodiment, the epicycle speed reduction gear mechanism comprises sun gear 310, planetary gears 320 supported on pins 332 and internal gear 340 formed in center casing 360, while the overrunning clutch comprises outer member 351, inner member 352 integral with output shaft 220 and rollers 353.

Figure 41:
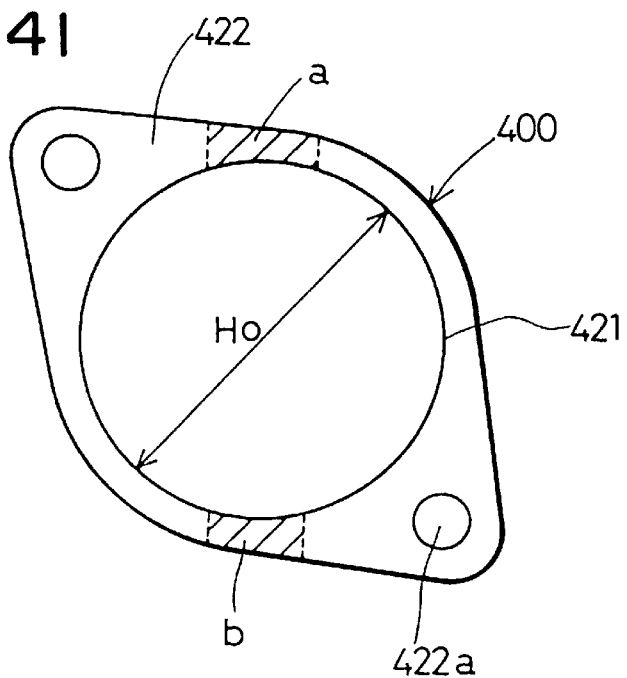
FIG. 41 is a side view of a housing.

Housing 400 is formed therearound with fitting part 421 which is press-fitted into fitting hole 120b of engine-side body or frame 120 such as engine block, and with flange 422 which abuts the fitting plane 120a of the engine-side body 120. Fitting part 421 is in a circular shape when viewed in the axial direction to be fitted with engine-side body 120 in the socket-and-spigot joint manner. The outer diameter Ho of the fitting part 421 is set larger than the axial length or distance Lw between fitting plane 120a (connection point between fitting part 421 and flange 422) and the center of gravity W of armature 540. Further, the outer diameter Ho is set larger than the distance Lo between fitting plane 120a and the axial side end (right side end in the figure) of armature core 520. From the fact that armature core 520 is the heaviest among armature component parts (armature shaft 510, coil conductor 530, commutator 534 and the like), the center of gravity W generally corresponds to the center of armature core 520. Flange 422 is located adjacent to the fitting part 421 and extends radially outwardly from fitting part 421 at the side of motor 500 and, as shown in FIG. 41, has a pair of bolt holes 422a for receiving therethrough fastening bolts (not shown) which are to be screwed into screw holes (not shown) to tightly fix housing 400 to engine-side body 120. Housing 400 is fitted with engine-side body 120 under the condition that bolt holes 422a are located diagonally with respect to horizontal and vertical lines.

Magnet switch 600 is located radially outside starter motor 500 and fixed to housing 400 with its switch casing 691 being tightly fastened to housing 400 via bolts and nuts (not shown). One open end of switch casing 691 is closed by resin-made insulating switch cover 690. Inside switch casing 691, attraction coil 650, plunger 610, stationary core 642, spring 660 and the like are disposed. Battery terminal (not shown) and motor terminal 625 which is connected to starter motor 500 through lead wire 910a are mounted on switch cover 690. Inside switch cover 690, a movable contact 612 fixed to plunger shaft 615 and a pair of fixed contacts 630 connected respectively to battery terminals and motor terminal 625 are disposed. Plunger 610 is linked at a joint 672 with a shift lever 671 which pivots around a fulcrum 673 supported by housing 400, and shift lever 671 is linked with pinion 200. Thus, when attraction coil 650 is energized to attract plunger 610 toward motor terminal 625, magnet switch 600 supplies electric power to motor 500 through electrical contact between movable contact 612 and fixed contacts 630 and also move pinion toward ring gear 100 through shift lever 671.

The starter according to this embodiment operates generally in the similar manner as in the first embodiment and therefore explanation thereof is omitted for brevity.

According to this embodiment, the starter is supported in the cantilever manner by engine-side body 120. That is, the starter is mounted on engine-side body 120 with only housing 400 being fitted at its fitting part 421 and flange 422. In this case, the stress which exerts on fitting plane 120a of engine-side body 120 increases as the center of gravity W of armature 540 of motor 500 is located farther away in the axial direction from the fitting plane 120. However, with the axial distance Lw of the center of gravity W of armature 540 being set shorter than the diameter Ho of circular fitting part 421 of housing 400, the stress exerting on the fitting plane 120 is reduced. Further, as shown in FIG. 41, with bolt holes 422a of flange 422 being positioned diagonally with respect to the vertical and horizontal lines, the load applied to the fitting plane 120a at the time of vibration of the starter is received mostly at four areas of flange 422, i.e., around two bolt holes 422a and two areas "a" and "b" which are on the vertical line. Thus, the influence of the vibration transmitted from the engine can be reduced and hence bearing wear caused by the armature rotation can be reduced as well. Those advantages will be made more remarkable provided that the axial distance Lo of the armature core axial side end to which commutator 534 is formed is set shorter than the diameter Ho of fitting part 421 of housing 400.

Figure 42:
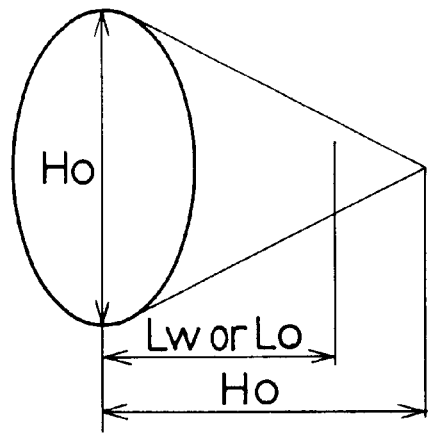
FIGS. 42 and 43 are explanatory views showing the relation between the outer diameter of a fitting part and the location of an armature.
Figure 43:
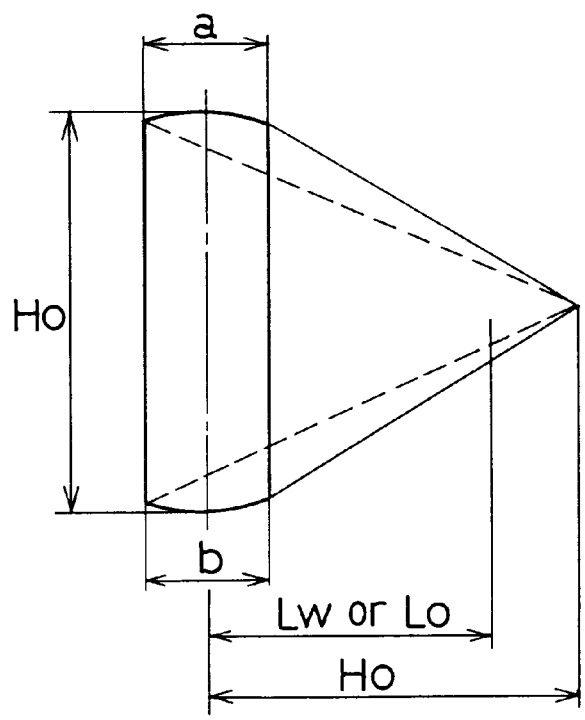
Figure 44:
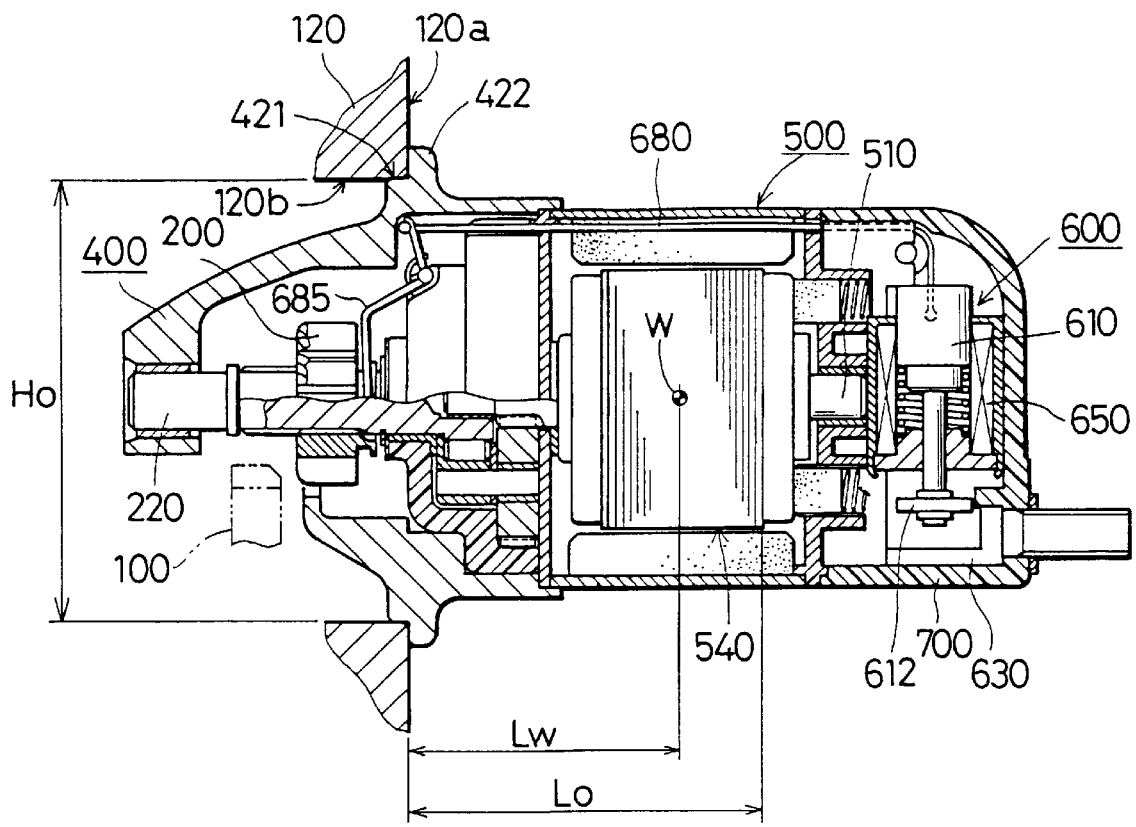
FIG. 44 is a cross-sectional view of a starter according to the third embodiment of the present invention.

The above-described relation between the diameter Ho and the distance Lw or Lo means that, as shown in FIG. 42, the point corresponding to the distance Lw or Lo resides within a cone having the bottom surface of the diameter Ho and the same height as the diameter Ho. It is more preferred that, as shown in FIG. 43, the point corresponding to the distance Lw or Lo is located within the limited space defined by the load receiving areas "a" and "b" in the cone.

THIRD EMBODIMENT

The starter according to the third embodiment is more similar to the first embodiment. In this embodiment, magnet switch 600 is disposed axially oppositely to pinion 200 with respect to starter motor 500. Plunger 610 is disposed to move perpendicularly to armature shaft 510 and operatively linked with pinion 200 via wire 680 and a lever 685. The outer diameter Ho of fitting part 421 of housing 400 is set larger than the axial distances Lw and Lo thereby to maintain or enhance resistivity of the starter to vibration even with magnet switch 600 being attached to the axial side of starter motor 500.

Figure 45A:
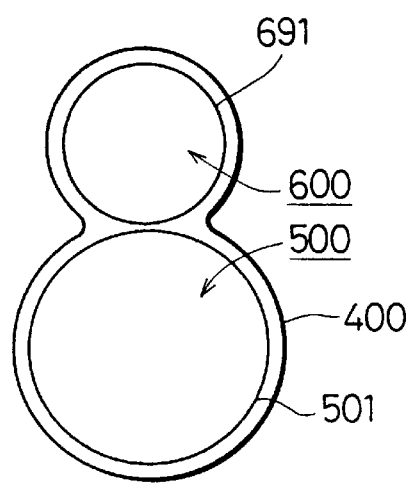
FIGS. 45A and 45B are explanatory views of the housings in the second embodiment and the third embodiments, respectively.
Figure 45B:
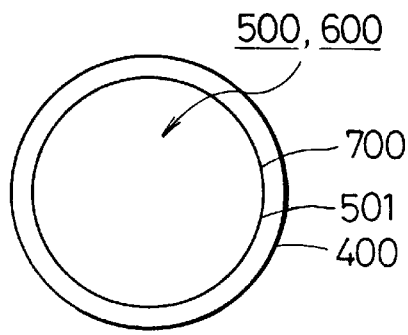
Figure 46:
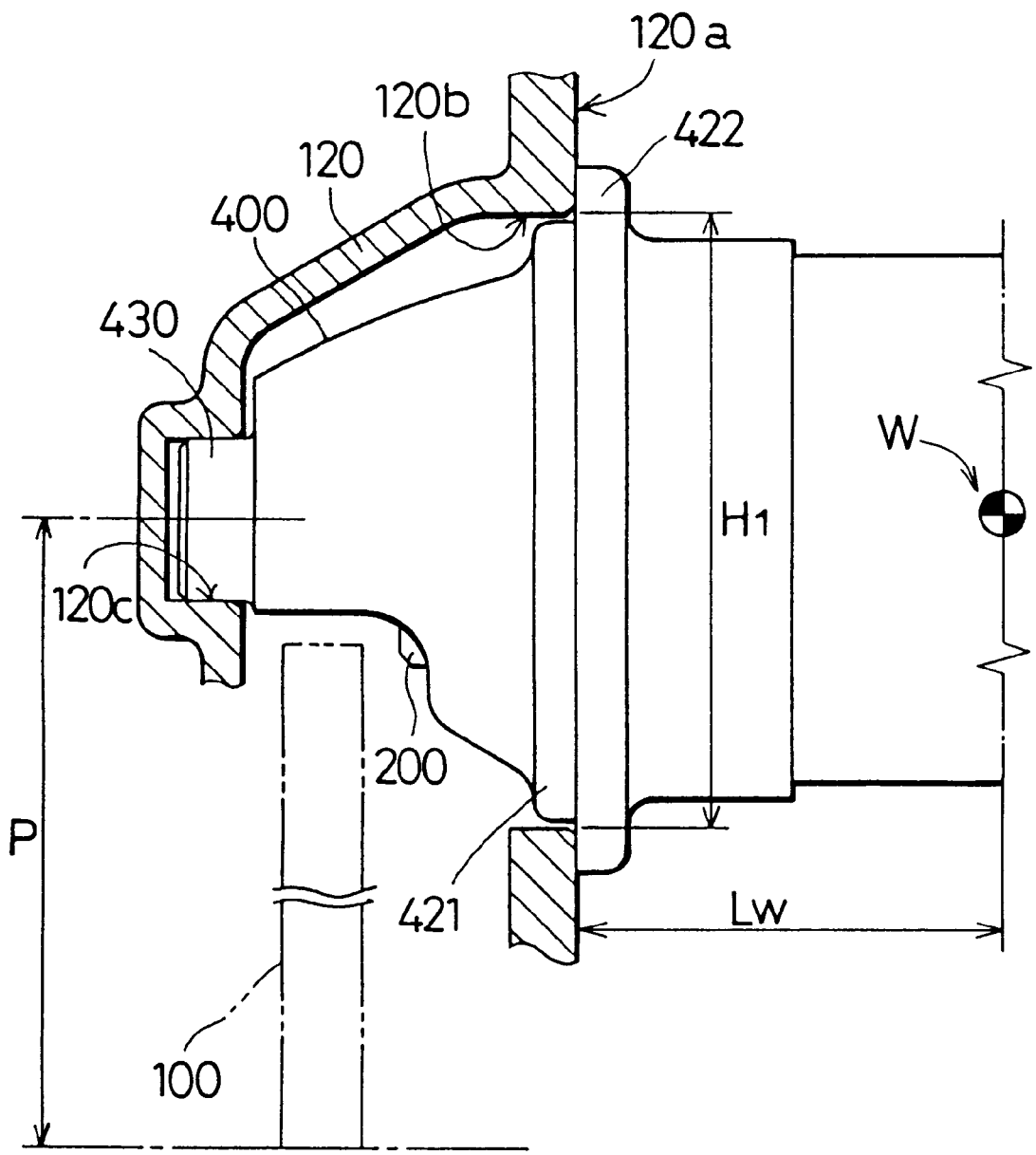
FIG. 46 is a partial cross-sectional view of a starter according to the fourth embodiment of the present invention.

According to this embodiment, as the front or rear side area of the starter is reduced remarkably as shown in FIG. 45B than that of the starter according to the second embodiment shown in FIG. 45A, the starter may be mounted on or fitted with the engine more easily. Further, as the center of gravity of magnet switch 600 is located more closely in the radial direction to armature shaft 510 in the third embodiment than in the second embodiment in which magnet switch 600 is mounted radially outside starter motor 500, the influence of vibration to magnet switch 600 can be reduced.

FOURTH EMBODIMENT

The starter according to the fourth embodiment has housing 400 provided with cylindrical front end part 430 which is press-fitted into hole 120c provided in engine-side body 120. The pitch "P" between ring gear 100 and pinion 200 is thus determined. In this starter, as cylindrical part 430 is press-fitted into hole 120c with flange 422 being in abutment with fitting plane 120a, the diameter Ho of fitting part 421 is set slightly smaller than the inner diameter H1 of fitting hole 120b of engine-side body 120 so that the fitting part 421 is only loosely inserted into fitting hole 120b. That is, fitting part 421 is not fitted in the socket-and-spigot manner but is held in fitting hole 120b with a small clearance against fitting hole 120b. In this starter, the diameter H1 of fitting hole 120b which is substantially equal to the outer diameter Ho is set larger than the axial distance Lw between fitting plane 120a and the center of gravity W of armature 540 and, preferably, than the axial distance Lo of the axial side end of armature 540 so that the resistivity of the starter against vibration an be enhanced.

The present invention having been described hereinabove may be modified further without departing from the scope and spirit of the invention.

What is claimed is:

1. A starter for an engine having a ring gear and an engine-side body formed with a fitting hole extending from a fitting plane surface, the starter comprising:

a starter motor having an armature which is rotated when energized, said armature having a center of gravity, said center of gravity of the armature being located to coincide substantially with a center of an armature core of the armature;

an output shaft rotatable by the armature;

a pinion disposed movably along the output shaft to engage the ring gear and transmit the rotation of the output shaft to the ring gear;

an overrunning clutch and a reduction gear mechanism disposed between the starter motor and the pinion;

a housing supporting one end of the output shaft rotatably therein and having a fitting part which is to be fitted into to engage at least a part of a wall of the fitting hole of the engine-side body, said housing having an end face to be abutted against said fitting plane surface when said fitting part is fitted into the fitting hole; and an outer diameter of the fitting part being set larger than a distance between said end face of the housing and the center of the gravity of the armature.

2. A starter according to claim 1, further comprising:

a magnet switch disposed axially oppositely to the pinion with respect to the motor for moving the pinion toward the ring gear.

3. A starter according to claim 1, wherein:

the starter motor has a commutator formed by a part of an armature coil of the armature, and a brush disposed in slidable contact with said part of the armature coil.

4. A starter according to claim 1, wherein:

the armature has an armature core and an armature coil disposed on the armature core;

the armature coil extending in an axial direction and in a radial direction of the armature core; and wherein a brush is disposed in slidable contact with the armature coil at a coil part extending in the radial direction whereby the coil part defines a commutator.

5. A starter according to claim 1, wherein:

the armature has an armature core and an armature coil disposed on the armature core;

the armature coil extends in an axial direction of the armature core and in a radial direction of the armature core along both axial side ends of the armature core; and a brush is disposed in slidable contact with the armature coil at a coil part extending in the radial direction along one of the axial side ends of the armature core whereby the coil part defines a commutator.

6. A starter according to claim 5, wherein:

the coil part and the brush are disposed at an axially opposite end of the armature core with respect to the pinion.

7. A starter according to claim 1, wherein:

the armature has an armature shaft; and the output shaft has an axial end part operatively coupled to an axial end part of the armature shaft through the overrunning clutch and the reduction gear mechanism.

8. A starter for an engine having a ring gear and an engine-side body formed with a fitting hole extending from a fitting plane surface, the starter comprising:

a starter motor having an armature which is rotated when energized, said armature having a center of gravity;

an output shaft rotatable by the armature;

a pinion disposed movably along the output shaft to engage the ring gear and transmit the rotation of the output shaft to the ring gear;

a housing supporting one end of the output shaft rotatably therein and having a fitting part which is to be fitted into, to engage a wall of, the fitting hole of the engine-side body, said housing having an end face to be abutted against said fitting plane surface when said fitting part is fitted into the fitting hole; and an outer diameter of the fitting part being set larger than a distance between said end face and one axial side end of the armature, said one axial side end being located at an axially opposite side of the armature core with respect to the pinion, wherein:

the starter motor has a commutator formed by a part of an armature coil of the armature, and a brush disposed in slidable contact with said part of the armature coil.

9. A starter for an engine having a ring gear and an engine-side body formed with a fitting hole extending from a fitting plane surface, the starter comprising:

a starter motor having an armature which is rotated when energized, said armature having a center of gravity;

an output shaft rotatable by the armature;

a pinion disposed movably along the output shaft to engage the ring gear and transmit the rotation of the output shaft to the ring gear;

a housing supporting one end of the output shaft rotatable therein and having a fitting part which is to be fitted into, to engage a wall of, the fitting hole of the engine-side body, said housing having an end face to be abutted against said fitting plane surface when said fitting part is fitted into the fitting hole; and an outer diameter of the fitting part being set larger than a distance between said end face and one axial side end of the armature, said one axial side end being located at an axially opposite side of the armature core with respect to the pinion, wherein:

the armature has an armature coil disposed on the armature core;

the armature coil extends in an axial direction and in a radial direction of the armature core; and a brush is disposed in slidable contact with the armature coil at a coil part extending in the radial direction whereby the coil part defines a commutator.

10. A starter for an engine having a ring gear and an engine-side body formed with a fitting hole extending from a fitting plane surface, the starter comprising:

a starter motor having an armature which is rotated when energized, said armature having a center of gravity;

an output shaft rotatable by the armature;

a pinion disposed movably along the output shaft to engage the ring gear and transmit the rotation of the output shaft to the ring gear;

a housing supporting one end of the output shaft rotatably therein and having a fitting part which is to be fitted into, to engage a wall of, the fitting hole of the engine-side body, said housing having an end face to be abutted against said fitting plane surface when said fitting part is fitted into the fitting hole; and an outer diameter of the fitting part being set larger than a distance between said end face and one axial side end of the armature, said one axial side end being located at an axially opposite side of the armature core with respect to the pinion, wherein:

the armature has an armature coil disposed on the armature core;

the armature coil extends in an axial direction of the armature core and in a radial direction of the armature core along the axial side ends of the armature core; and a brush is disposed in slidable contact with the armature coil at a coil part extending in the radial direction along said one axial side end of the armature core whereby the coil part defines a commutator.

11. A starter for an engine having a ring gear and an engine-side body formed with a fitting hole extending from a fitting plane surface, the starter comprising:

a starter motor having an armature which is rotated when energized, said armature having a center of gravity;

an output shaft rotatable by the armature;

a pinion disposed movably along the output shaft to engage the ring gear and transmit the rotation of the output shaft to the ring gear;

a housing supporting one end of the output shaft rotatable therein and having a fitting part which is to be fitted into, to engage a wall of, the fitting hole of the engine-side body, said housing having an end face to be abutted against said fitting plane surface when said fitting part is fitted into the fitting hole; and an outer diameter of the fitting part being set larger than a distance between said end face and one axial side end of the armature, said one axial side end being located at an axially opposite side of the armature core with respect to the pinion, further comprising:

an overrunning clutch and reduction gear mechanism disposed between the armature and the pinion to operatively couple an other end of the output shaft and an end of an armature shaft of the armature.

12. A starter according to claim 11, wherein:

the overrunning clutch and reduction gear mechanism are disposed in the housing at a position closer to the starter motor than the fitting part of the housing.

13. A starter for an engine having a ring gear and an engine-side body formed with a fitting hole extending from a fitting plane surface, the starter comprising:

a starter motor having an armature including an armature core and an armature coil disposed on the armature core, the armature having a center of gravity, said center of gravity of the armature being located to coincide substantially with a center of an armature core of the armature, the armature coil having coil end parts extending radially along a first axial side end of the armature core, the starter motor further having brushes disposed slidably on said coil end parts of the armature coil to supply electric power to the armature coil for rotation of the armature core;

an output shaft;

a reduction gear mechanism disposed adjacent to a second axial side end of the armature core, opposite to the first axial side end, to rotate the output shaft in a reduced speed in response to the rotation of the armature core;

a pinion movably fitted on the output shaft to engage with the ring gear and transmit rotation of the output shaft to the ring gear; and a housing fixed to the starter motor adjacent the second axial side end of the armature core to cover the output shaft, the housing having a circular fitting part radially inside in the fitting hole and an abutting plane surface for abutment with the fitting plane surface in an axial direction, the fitting part having a diameter larger than an axial distance between the abutting plane surface and the center of gravity of the armature.

14. A starter according to claim 13, wherein:

the housing has a flange extending radially outwardly from the fitting part to define the abutting plane surface; and the flange has bolt holes provided diagonally so that the flange may be fixed to the engine-side body with the bolt holes being positioned diagonally with respect to a horizontal line and a vertical line.

15. A starter according to claim 13, further comprising:

a magnet switch disposed adjacent to the first axial said end of the armature in an axial direction so that the magnet switch has a center of gravity thereof near an axial line which passes through the center of gravity of the armature.

16. A starter according to claim 15, wherein:

the reduction gear mechanism is disposed radially inside of the housing at a position closer to the second axial side end than the abutting plane surface of the housing.

17. A starter according to claim 16, wherein:

the diameter of the fitting part is larger than an axial distance between the abutting plane surface and the first axial side end of the armature.

\* \* \* \* \*